United States Patent
Dzierwinski

(10) Patent No.: US 10,263,869 B1
(45) Date of Patent: Apr. 16, 2019

(54) ANALYSIS AND TESTING OF NETWORK DEVICES

(71) Applicant: Amazon Technologies, Inc., Seattle, WA (US)

(72) Inventor: Kevin Michael Dzierwinski, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 211 days.

(21) Appl. No.: 14/659,441

(22) Filed: Mar. 16, 2015

(51) Int. Cl.
*H04L 12/26* (2006.01)

(52) U.S. Cl.
CPC .......... *H04L 43/0876* (2013.01); *H04L 43/50* (2013.01)

(58) Field of Classification Search
CPC ..... H04L 43/0876; H04L 43/50; H04L 45/22; H04L 45/28; H04L 41/0668; H04L 43/0811; H04L 51/28; H04L 41/18; H04L 45/16; H04L 41/0663; H04L 45/00; G06F 11/273; G06F 11/00; G06F 11/0748; G06F 11/0793; G06F 11/24; G06F 11/349; G03G 15/55; H04N 1/00002; H04N 1/00042; H04N 1/00344; H04N 1/32625; H04W 24/00; H04W 43/0876
See application file for complete search history.

(56) References Cited

U.S. PATENT DOCUMENTS

| | | | |
|---|---|---|---|
| 5,361,372 A | 11/1994 | Rege et al. | |
| 6,643,607 B1 * | 11/2003 | Chamberlain | .......... H04L 43/50 455/226.1 |
| 7,190,766 B1 | 3/2007 | McDonald et al. | |
| 7,457,868 B1 | 11/2008 | Guo | |
| 7,885,204 B1 * | 2/2011 | Schongar | ............ H04L 12/2697 370/254 |
| 8,289,845 B1 | 10/2012 | Baldonado et al. | |
| 8,423,226 B2 * | 4/2013 | Underdal | ............... G06F 7/005 701/31.4 |
| 8,428,813 B2 * | 4/2013 | Gilbert | ..................... G06N 5/04 701/31.4 |
| 8,547,855 B1 | 10/2013 | Zingale et al. | |
| 8,648,700 B2 * | 2/2014 | Gilbert | ................ B60R 16/0234 340/425.5 |
| 8,744,390 B2 * | 6/2014 | Stratford | ................ H04B 17/12 343/703 |
| 8,762,165 B2 * | 6/2014 | Gilbert | ................... G06N 5/003 705/2 |
| 8,844,041 B1 * | 9/2014 | Kienzle | ................... H04L 41/12 709/224 |
| 9,032,068 B2 | 5/2015 | Chakrabarti et al. | |
| 9,081,883 B2 * | 7/2015 | Wittliff, III | ............ G06N 7/005 |
| 9,503,384 B1 | 11/2016 | Oliveira et al. | |

(Continued)

*Primary Examiner* — Sargon N Nano
(74) *Attorney, Agent, or Firm* — Davis Wright Tremaine LLP

(57) ABSTRACT

A network administrator utilizes a user client device to connect to a server within a network and provide a test plan comprises various tests to be performed on pairs of devices having physical connections within the network. The server selects, from the various pairs of devices, a pair of devices that are to be tested. Subsequently, the server transmits to each device of the selected pair of devices, instructions that may cause each device to perform the tests specified within the test plan. Once the tests have been completed, the server obtains the test results from the pair of devices and compiles these results.

20 Claims, 12 Drawing Sheets

(56) References Cited

U.S. PATENT DOCUMENTS

| | | | |
|---|---|---|---|
| 9,576,252 B2* | 2/2017 | Haber | G06Q 10/00 |
| 2005/0232227 A1 | 10/2005 | Jorgenson et al. | |
| 2005/0243854 A1 | 11/2005 | Ward | |
| 2008/0137543 A1* | 6/2008 | Mitra | H04L 43/50 |
| | | | 370/242 |
| 2011/0088014 A1* | 4/2011 | Becker | G06F 11/3684 |
| | | | 717/125 |
| 2012/0051263 A1* | 3/2012 | Ozawa | H04L 12/2697 |
| | | | 370/254 |
| 2014/0068337 A1* | 3/2014 | Rossario | H04L 41/12 |
| | | | 714/32 |
| 2014/0105045 A1 | 4/2014 | Oh et al. | |
| 2014/0112148 A1 | 4/2014 | Flinta et al. | |
| 2014/0119221 A1 | 5/2014 | Park et al. | |
| 2015/0163108 A1* | 6/2015 | Wong | H04L 41/12 |
| | | | 709/224 |
| 2015/0188780 A1 | 7/2015 | Spieser | |
| 2015/0326457 A1* | 11/2015 | Wu | H04L 43/12 |
| | | | 370/252 |
| 2015/0333993 A1 | 11/2015 | Welin et al. | |

* cited by examiner

ANALYSIS AND TESTING OF NETWORK DEVICES

BACKGROUND

Many companies and other organizations operate computer networks that interconnect numerous computing systems to support their operations, such as with computing systems that are co-located (e.g., as part of a local network) or instead located in multiple distinct geographical locations (e.g., connected via one or more private or public intermediate networks). For example, data centers housing significant numbers of interconnected computing systems have become commonplace; there are private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. As the scale and scope of typical data centers has increased, the task of managing and maintaining the physical computing resources have become increasingly complicated.

BRIEF DESCRIPTION OF THE DRAWINGS

Various embodiments in accordance with the present disclosure will be described with reference to the drawings, in which.

DETAILED DESCRIPTION

Figure 1:
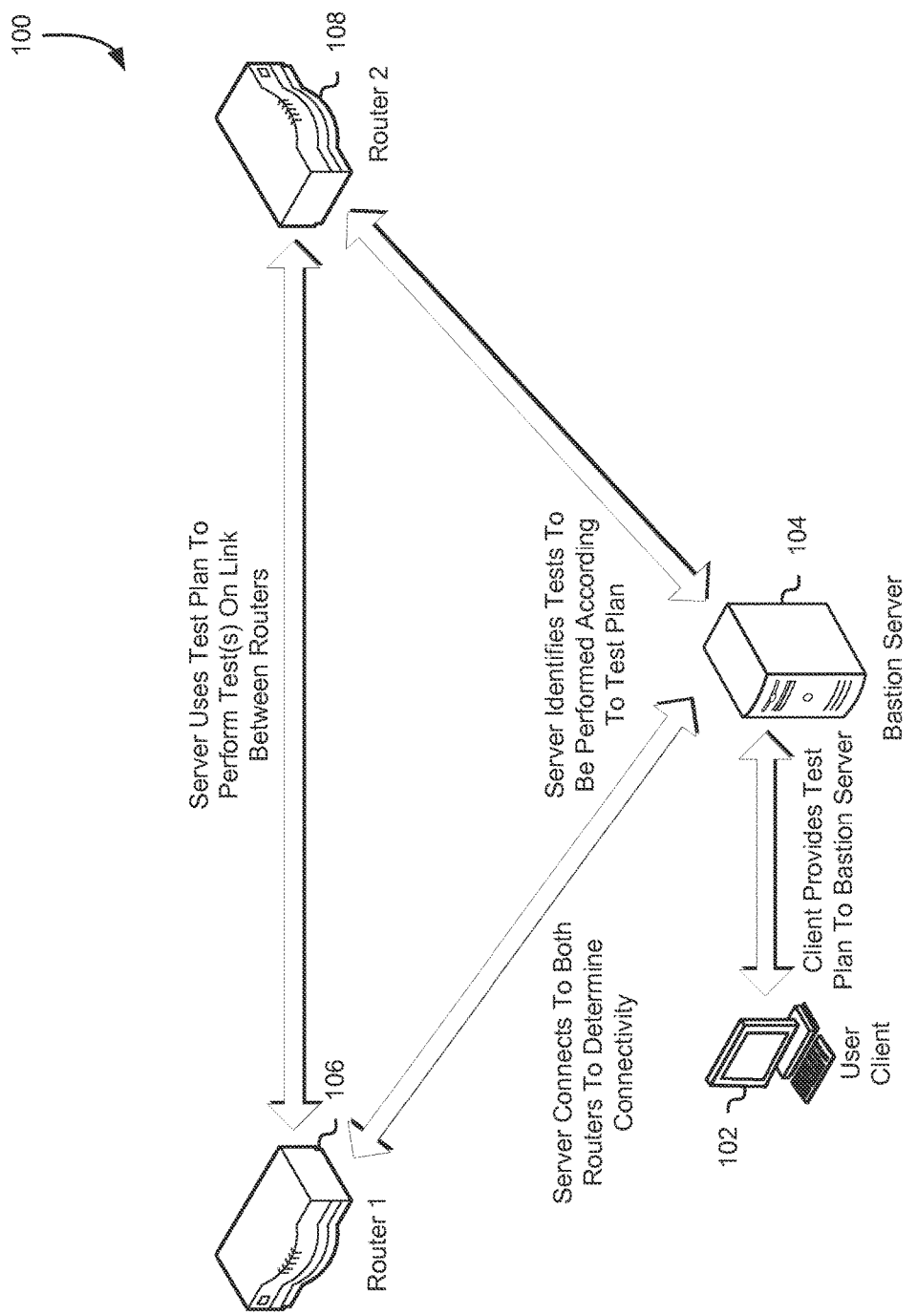
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to a framework for the testing and analysis of various network devices and connections within a distributed network. In an embodiment, an administrator of a distributed network utilizes a user client device or other computing device to access and use a test plan interface to establish a test plan that may be used to test and analyze physical connections between various networking devices (e.g., routers, network switches, servers, etc.) within the distributed network. The test plan interface may enable the administrator to generate a test plan by describing certain steps to be performed during various stages of testing a link between various network devices. The test plan may comprise five distinct phases of testing for a particular link: pre-check analysis, pre-test analysis, test analysis, post-check analysis and post-test summary. It should be noted that a test plan may include additional and/or alternative phases so long as these phases sufficiently enable validation and analysis of links between network devices of the distributed network. The instructions described by the administrator within the test plan may enable a bastion server within the distributed network to perform various operations, tests and analyses for a variety of network devices in order to execute the test plan.

Once the test plan has been generated by the administrator of the distributed network, the administrator or other network technician may access the bastion server through a user client device to provide and execute the test plan. In an embodiment, the bastion server, upon receiving the test plan from the user client device, executes the pre-check phase of the test plan. This may include determining whether the networking devices are in a state in which the network device interfaces may be activated to perform the tests and whether disruption of the normal operation of these network devices may have a significant negative impact on customers and other users of the distributed network. If the pre-check phase is completed successfully, the bastion server may then execute the pre-test phase of the test plan, which may include activating the network device interfaces (if the interfaces are offline) and determining whether the network devices being tested are linked to one another as specified within a network device route table or database for each network device. If any of the network devices fail any portion of the pre-check phase or the pre-test phase, the bastion server may terminate execution of the test plan and transmit a notification to the user client device indicating that at least one network device cannot be utilized for testing.

If the networking devices being tested successfully pass the pre-check and pre-test phases, the bastion server may execute the test phase. During the test phase, the bastion server may activate the network device interfaces (if previously offline) and assign, to each network device being tested, a test-specific Internet Protocol (IP) address. Subsequently, the bastion server may perform any tests and analyses specified within the test plan that are part of the test phase and record these results for later reporting. Once this has been completed, the bastion server may reset the IP addresses for the networking devices and execute the post-check phase, which may include validating any interface counters, validating optic levels from the network device transceivers and identify any optical issues with the link between these network devices. The bastion server, upon completion of the post-check phase, may execute the post-test phase, which may cause the bastion server to reset the network device interfaces to their original state (if changed during the pre-test phase) and provide a summary of the test results to the user client device. In some embodiments, the network devices use the Open Shortest Path First (OSPF) protocol, which may adjust the network device route table or database for each network device in the event of a network device error or failure detected by the bastion server during the execution of the test plan. This may cause the network devices to compute, using a shortest path first algorithm, a shortest path tree that may be used to adjust the network device route table or database.

In this manner, an administrator of a distributed network or other network technician may develop and execute a test plan for a variety of network devices within the distributed network and identify any issues that may need to be addressed without causing significant network disruption. In addition, the techniques described and suggested herein facilitate additional technical advantages. For example, because the test plan is configured to terminate in the event the network devices being tested fail either the pre-check or pre-test phases, the bastion server will not be able to perform any tests and analyses that would not yield fruitful results due to the failure of the link between the network devices being tested or the network devices themselves. Further, if the network traffic through the link is significant, the bastion server will not remove the affected network devices from service to perform additional tests and analyses, thus preventing a significant disruption to network traffic that may impact the customers of the computing resource service provider. This may not only provide an improved customer experience but may also lead to a faster determination of a problem with any network devices and/or links within the distributed network.

FIG. 1 shows an illustrative example of an environment 100 in which various embodiments can be implemented. In the environment 100, a network administrator or other network technician/engineer may utilize a user client device 102 to provide a test plan to a bastion server 104 for testing links between one or more network devices 106, 108 (e.g., routers, switches, servers, etc.) within a large, distributed network and the one or more network devices 106, 108 themselves. Through the user client device 102, a network administrator or other network technician/engineer may utilize a test plan interface to generate the test plan that is to be provided to the bastion server 104. This test plan interface may be provided by a computing resource service provider through one or more services provided by the computing resource service provider to network administrators and other network technicians and engineers. For instance, the network administrator may utilize the user client device 102 and, through a communications network (e.g., Internet), transmit a request to the one or more services to access the test plan interface. Alternatively, the user client 102 may have installed an application provided by the computing resource service provider that includes the test plan interface. This may enable the network administrator and other network technicians and engineers to access the test plan interface while offline or otherwise disconnected from the computing resource service provider network.

When the network administrator or network technician/engineer accesses the test plan interface to create a new test plan, he/she may be presented with a default test plan that includes five distinct phases and, for each phase, one or more tests and analyses to be performed. For instance, the default test plan may include a pre-check phase, a pre-test phase, a test phase, a post-check phase, and a post-test phase, although it should be noted that in some embodiments, the default test plan may include additional, fewer, or alternative phases as deemed necessary to successfully determine the operability and functionality of the network devices 106, 108 and the link between these network devices 106, 108. The pre-check phase and the pre-test phase may include one or more tests and analyses that may be performed to determine whether the network devices 106, 108 and/or the link between the network devices 106, 108 may be utilized for the test phase of the test plan. If the network devices 106, 108 fail any subset of tests of the pre-check or pre-test phases of the test plan, the execution of the test plan may be terminated as the network devices 106, 108 may either not be capable of performing the one or more tests and analyses that comprise the test phase of the test plan or usage of the network devices 106, 108 may result in significant network disruption. If the network devices 106, 108 successfully pass the pre-check and pre-test phases of the test plan, the test phase of the test plan may be executed, which may include performance of one or more tests as specified by network administrator or other network technician/engineer to identify any potential issues with the network devices 106, 108 and/or the link between these network devices 106, 108. As opposed to the pre-check and pre-test phases, failure of any tests and/or analyses of the test phase may not result in termination of the execution of the test plan. Instead, any failures, errors or issues may be recorded and reported to the network administrator once the test plan has been performed. The post-check and post-test phases of the test plan may include additional tests and analyses for identifying any potential issues with the physical connection between the network devices 106, 108 and for returning the network devices 106, 108 to their original configuration prior to execution of the test plan. Further, these phases of the test plan may include providing a summary of the results of the various tests and analyses performed throughout the execution of the test plan.

Once the network administrator or other network technician/engineer has utilized the test plan interface to define a new test plan for the various network devices 106, 108 within the distributed network, he/she may connect his/her user client device 102 to a bastion server 104 to provide the test plan to the bastion server 104 and initiate execution of the test plan. For instance, the bastion server 104 may obtain the test plan from the client device 102 and utilize one or more programming libraries to identify, for each specified test and analysis specified within the test plan, the operations to be performed. In an embodiment, upon receiving the test plan from the user client device 102, the bastion server 104 may access a network topology service to identify a network device pair for testing. Once the bastion server 104 has identified the network device pair to be tested, the bastion server 104 may establish a connection with each network device 106, 108 of the network device pair and initiate execution of the test plan.

The bastion server 104, upon connection to the pair of network devices 106, 108 may execute the pre-check phase of the test plan. For instance, the bastion server 104 may transmit a request to each network device 106, 108 to determine the interface status for the network device 106, 108. For instance, a network device may be operating normally, wherein the interface for the network device is online and functioning (e.g., UP/UP). Alternatively, the network device interface may be offline due to an administrative action or request (e.g., DOWN/DOWN), in which case the interface may still be activated and the network device used for testing purposes. Either of these cases may be acceptable, as the network device may be operating normally and may be configured to process network traffic through its connection with other network devices. However, if the network device interface is offline due to an issue and not through administrative action (e.g., UP/DOWN), the network device may not be utilized for testing, as the network device may require technical support in order for the interface to be activated. Thus, if a network device 106, 108 fails this interface test during the pre-check phase of the test plan, the bastion server 104 may terminate the test plan and transmit a notification to the user client device 102 concerning the issue.

In addition to the interface test, the pre-check phase of the test plan may cause the bastion server 104 to evaluate the connection (e.g., link) between the network devices 106, 108 being tested to determine the network traffic flowing through the connection. For instance, when creating the test plan, the network administrator may define a threshold for network traffic along a connection that, if exceeded, would result in a network traffic test failure. Failure of such a network traffic test may denote that disruption of the connection between the network devices of the pair of network devices 106, 108 may result in significant disruption of network traffic, which increase network latency and potentially cause additional issues to customers utilizing the network. Thus, if the connection between the network devices 106, 108 being tested fails the network traffic test, the bastion server 104 may also terminate the test plan.

If the network devices 106, 108 pass the pre-check phase, the bastion server 104 may move into the pre-test phase of the test plan. Here, the bastion server 104 may determine which network device interfaces are offline and attempt to activate these interfaces in order to perform the various tests specified within the test phase of the test plan. For example, if the interface for network device 106 (e.g., Router 1) is offline due to an administrative action, the bastion server 104 may transmit a request to the network device 106 to activate the interface. Once the network device interfaces have been activated, the bastion server 104 may perform a neighbor test for the network devices 106, 108 to determine whether the network devices 106, 108 are meant to be connected to one another. For instance, the bastion server 104 may transmit a request to each network device 106, 108 to specify an identifier of the network device that is supposed to be connected to the network device 106, 108. For instance, if the network device 106 (e.g., Router 1) responds to the request by indicating that it is supposed to be connected to a network device other than network device 108 (e.g., Router 2), then the connection between the network devices 106, 108 is in error. By performing any further tests on the connection between the network devices 106, 108, the bastion server 104 may remove additional network devices from network operation during further execution of the test plan, which may cause additional network disruption. To mitigate this risk, if the network devices 106, 108 fail the neighbor test, the bastion server 104 may terminate the test plan and notify the network administrator of the problem. This may enable the network administrator to send a technician the colocation center for the network to correct this issue.

Once the bastion server 104 has successfully completed the pre-check and pre-test phases of the test plan, the bastion server 104 may perform the one or more tests and analyses specified within the test phase of the test plan. For instance, the bastion server 104, prior to performing any tests specified by the network administrator, may assign to each network device 106, 108 a unique test IP address from a test IP address range created by the computing resource service provider for testing purposes. To ensure that this process was performed successfully, the bastion server 104 may perform a ping test across the link between the network devices 106, 108 to ensure connectivity between network device 106 and network device 108. Upon establishing assigning the test IP addresses to each of the network devices 106, 108, the bastion server 104 may identify the tests and analyses specified by the network administrator in the test plan and access the programming libraries corresponding to these tests to initiate execution of the various tests and analyses specified in the test plan. For instance, the bastion server 104 may perform a more substantial ping test, which may cause the bastion server 104 to record the time it takes to transmit a certain number of packets across the link between network device 106 and network device 108. For example, the ping test may require that network device 106 transmit a set of packets to network device 108 and, in response, network device 108 to transmit this set of packets back to network device 106. This action may be performed a number of times specified by the network administrator within the test plan in order to obtain various data points for analysis. The bastion server 104 may evaluate the ping test to identify the amount of time for the packets to be transmitted from network device 106 to network device 108 and back, as well as any packet loss during transmission.

Upon completion of the test phase, the bastion server 104 may reset the IP addresses for the network devices 106, 108 and begin execution of the post-check phase of the test plan. As part of the post-check phase of the test plan, the bastion server 104 may obtain, from network device 106 and network device 108, the number of counters for the network device interfaces. These counters may include Cyclical Redundancy Check (CRC) errors (e.g., checksum on a packet failed, requiring retransmission of a packet, etc.), hardware errors, symbol errors, and the like. These counters may be recorded by the bastion server 104 in a test summary, which may be provided to the network administrator upon completion of test plan. Once the bastion server 104 has obtained the number of counters from each network device 106, 108, the bastion server 104 may perform a transceiver test on both network devices 106, 108 to identify any potential issues with the physical connection between the network devices 106, 108. These results may also be recorded by the bastion server 104 within the test summary.

The bastion server 104, upon completion of the post-check phase of the test plan, may return the network device interfaces to their original status prior to execution of the test plan and prepare the test summary for the network administrator. This may include compiling the various results from the tests and analyses performed as part of the pre-check, pre-test, test, and post-check phases of the test plan and transmitting the test summary to the user client device 102 connected to the bastion server 104. In some embodiments, the bastion server 104 may transmit this test summary to a network topology service, where the test summary may be stored and accessed by network administrators, technicians and engineers as needed. Based at least in part on the results reported within the test summary, a network administrator may identify any issues that need to be corrected and task a network technician or engineer to rectify any of these issues.

Figure 2:
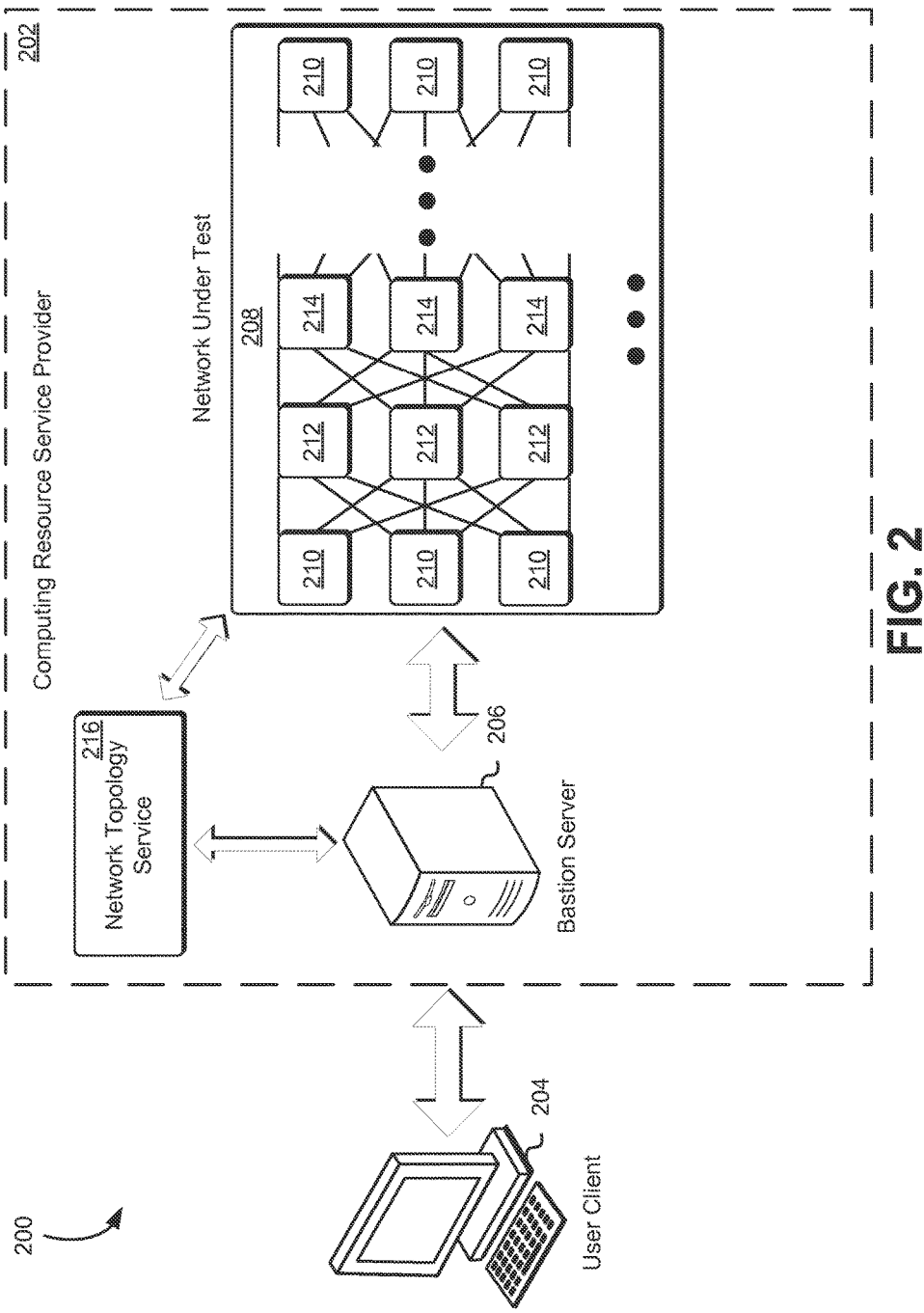
FIG. 2 shows an illustrative example of an environment in which a user client can be used to connect to a bastion server to perform one or more tests on network hardware within a large network in accordance with at least one embodiment.

As noted above, a network administrator or other network technician/engineer may connect a user client device to a bastion server to provide a test plan, which may cause the bastion server to execute the test plan for a variety of network devices and links within a distributed network. Accordingly, FIG. 2 shows an illustrative example of an environment 200 in which a user client device 204 can be used to connect to a bastion server 206 to perform one or more tests on network hardware within a large network 208 in accordance with at least one embodiment. In the environment 200, a network administrator or other network technician/engineer may connect a user client device 204 to a bastion server 206 provided by the computing resource service provider 202 for testing various network devices 210, 212, 214 within a particular network 208. The bastion server 206 may include one or more programming libraries, which may be include various command line operations that may be performed as part of a test or analysis of network devices 210, 212, 214. The network administrator or other network technician/engineer may utilize the user client device 204 to create a test plan that includes, for each distinct phase of the test plan, a variety of commands that may be associated with these programming libraries. Thus, when the bastion server 206 examines a command within the test plan, the bastion server 206 may identify the appropriate programming library and utilize the various command line operations specified within the library to perform the desired test or analysis.

The bastion server 206 may be a computer system or other collection of computing resources (e.g., network of computer systems) configured to connect to various computing devices of the network under test 208, perform various test operations as specified within the test plan, and compare the obtained test results to expected results. The network under test 208 may be a dense, multi-path, multi-layer internal interconnected network 208 that includes a plurality of different physical paths between computing devices connected and/or included in the network under test 208. The physical paths may be cables, such as fiber optic cables, or other connections between interfaces of the computing devices connected and/or included in the network under test 208. As illustrated in FIG. 2, the network under tests 208 is shown as comprising a number of distinct layers, including outer layers comprising interconnect nodes 210, and inner layers comprising a different class of interconnect nodes 212 and 214. The outer layer nodes 210 may differ from the inner layer nodes 212 and 214, such as the physical arrangement of the nodes, the number of nodes per rack, the number of distinct in and/or out interfaces at each node, the performance capabilities of the physical links leading into and/or out of the nodes, and so on.

The nodes 210, 212, and 214 may comprise a variety of different computing devices including routers, switches, hubs, network bridges, or other computing devices suitable for using in a network 208. The nodes 210, 212, and 214 may contain one or more interfaces, such as ports, which may be connected to an interface of another node. In various embodiments, the interfaces of the nodes 210, 212, and 214 are connected in a predefined pattern or topology determined based at least in part on networking requirements. The topology information may be maintained in an authoritative data store maintained through a network topology service 216 and accessible to the bastion server 206. The topology information, described in greater detail below, may be used by the network engineers to connect cables between the interfaces of the nodes 210, 212, and 214 indicated in the topology information. Furthermore, the bastion server 206 may use the topology information to validate the test results obtained from the nodes 210, 212, and 214.

The user client device 204 may connect to an interface of the bastion server 206, the interface may be configured to enable the user client device 204 to provide a test plan to enable the bastion server 206 to perform various testing operations and obtain test results. The user client device 204 may be utilized by a network administrator, network technician, or a network engineer as described above, responsible for connecting the interfaces of the nodes 210, 212, and 214. The network administrator, through the user client device 204, may transmit the test plan through use of the interface of the bastion server 206, which may cause the bastion server 204 to connect to various nodes and perform one or more tests and analyses as indicated in the test plan provided to the bastion server 206. For example, the bastion server 206 may access the network topology service 216 to identify a connection within the network 208 that is to be tested. For instance, the bastion server 206 may determine that the selected connection is between a node 210 and node 212 within the network 208. Thus, the bastion server 206 may connect to node 210 and node 212 to execute the test plan and perform one or more tests and analyses on the connection between the node 210 and node 212 and the nodes 210, 212 themselves.

In order to determine whether any tests or analyses specified within the test phase of the test plan may be performed, the bastion server 206 may execute the pre-check phase of the test plan. For instance, as part of the pre-check phase, the bastion server 206 may determine whether the interfaces for the nodes 210, 212 are activated or may be activated to support transmissions over the connection between the nodes 210, 212. Further, the bastion server 206 may evaluate the network traffic along the connection between node 210 and node 212 to determine whether disruption of the network traffic would have a significant impact on the network 208. For instance, a network administrator may specify a maximum network traffic threshold. Alternatively, the test plan may include a default threshold for network traffic in a connection. If the network traffic exceeds this threshold or the interfaces cannot be activated, the bastion server 206 may terminate the test plan.

If the nodes 210, 212 successfully pass the pre-check phase of the test plan, the bastion server 206 may execute the pre-test phase of the test plan. For instance, if any interfaces for the nodes 210, 212 are offline, the bastion server 206 may transmit a request to any affected node to activate any offline interfaces. If the interfaces have been successfully activated or were already active, the bastion server 206 may perform a neighbor test to determine whether the nodes 210, 212 are properly connected to one another through the connection. For example, the bastion server 206 may obtain information indicating that node 210 is connected to node 212 on port 1. The bastion server 206 may then determine that node 210 should be connected to node 212 through port 3. As a result of the determination, the bastion server 206 may return to the user client device 204 an indication that the node 210 is connected to node 212 through an incorrect port. This may cause the bastion server 206 to terminate execution of the test plan. Further, this information may enable the network administrator to alter the network under test 208 and connect node 210 to node 212 through port 3.

The bastion server 206 may perform any operations specified in the test phase of the test plan if the nodes 210, 212 and the connection between these nodes 210, 212 successfully pass the pre-check and pre-test phases of the test plan. As part of the test phase, the bastion server 206 may assign, to each node 210, 212, a unique test IP address and establish IP connectivity over the connection between the nodes 210, 212 for testing purposes. Subsequently, the bastion server 206 may determine whether the connection has been successfully established and data may be transmitted using this IP connection between the nodes 210, 212. The bastion server 206 may then perform any tests and analyses specified within the test plan as part of the test phase. The results of these tests and analyses may be recorded by the bastion server 206 within a test summary report, which may be generated upon completion of the test plan. As opposed to the pre-check and pre-test phases of the test plan, any failures discovered during the test phase may not cause the bastion server 206 to terminate the execution of the test plan.

Once the bastion server 206 has completed the test phase of the test plan, the bastion server 206 may reset the IP addresses for the nodes 210, 212 to their original configuration and perform the post-check phase of the test plan. This may include identifying, from the interfaces of the nodes 210, 212, any counters that may have been generated due to connectivity errors, hardware errors, or any other errors in the interfaces. These counters may be reported to the network administrator through the test summary provided upon completion of the test plan. Additionally, the bastion server 206 may perform one or more tests and analyses to evaluate the physical connection between nodes 210, 212. For instance, the bastion server 206 may perform a transceiver check to determine the signal strength of a light signal transmitted form each node and the signal strength of a light signal being received by each node. If the signal strength is below a particular threshold, the bastion server 206 may record this failure within the test summary.

Upon completion of the post-check phase of the test plan, the bastion server 206, as part of the post-test phase of the test plan, may generate a complete test summary, which may include the results of each test and analysis performed through execution of the test plan. This test summary may be provided to the user client device 204 immediately. Alternatively, in some embodiments, the bastion server 206 may store the test summary within a data store of the network topology service 216, which may enable various users to access the test summary as needed without need to access the specific user client device 204 that submitted the test plan to the bastion server 206. The bastion server 206, as part of the post-test phase, may also return the node interfaces to their original configuration prior to execution of the test plan. For instance, if an interface was offline and activated as part of the test plan, the bastion server 206 may again render the interface offline. After completion of the test plan, the bastion server 206 may access the network topology service 216 to identify a new node pair from the network 208 for testing. This may enable the bastion server 206 to automatically test each connection within the network 208 and identify any issues present within the network 208 for nodes 210, 212, and 214.

In an embodiment, if the nodes 210, 212, and 214 utilize the OSPF protocol, the bastion server 206 or another computer system responsible for managing at least a portion of the network may instruct the nodes of a node pair to modify their respective route tables in the event of a connection issue between nodes of a node pair. The route table may include, for each interface of a particular node that is connected to other nodes within the network 208, a weight that may be used by the node to select an interface connection that is to be utilized to transmit data to the next node within the network 208. Thus, if there is an issue with a particular connection, the bastion server 206 may transmit a request to the two nodes of the node pair to reduce the weight of this connection within their respective route tables to prevent or otherwise diminish data transmissions through this connection until any issues with the connection and the relevant nodes have been addressed. Once this connection successfully passes the tests included within the test plan, the bastion server 206 may instruct the nodes to update the route tables to assign the original weight to this connection and thereby enable data to be transmitted through this particular connection.

Figure 3:
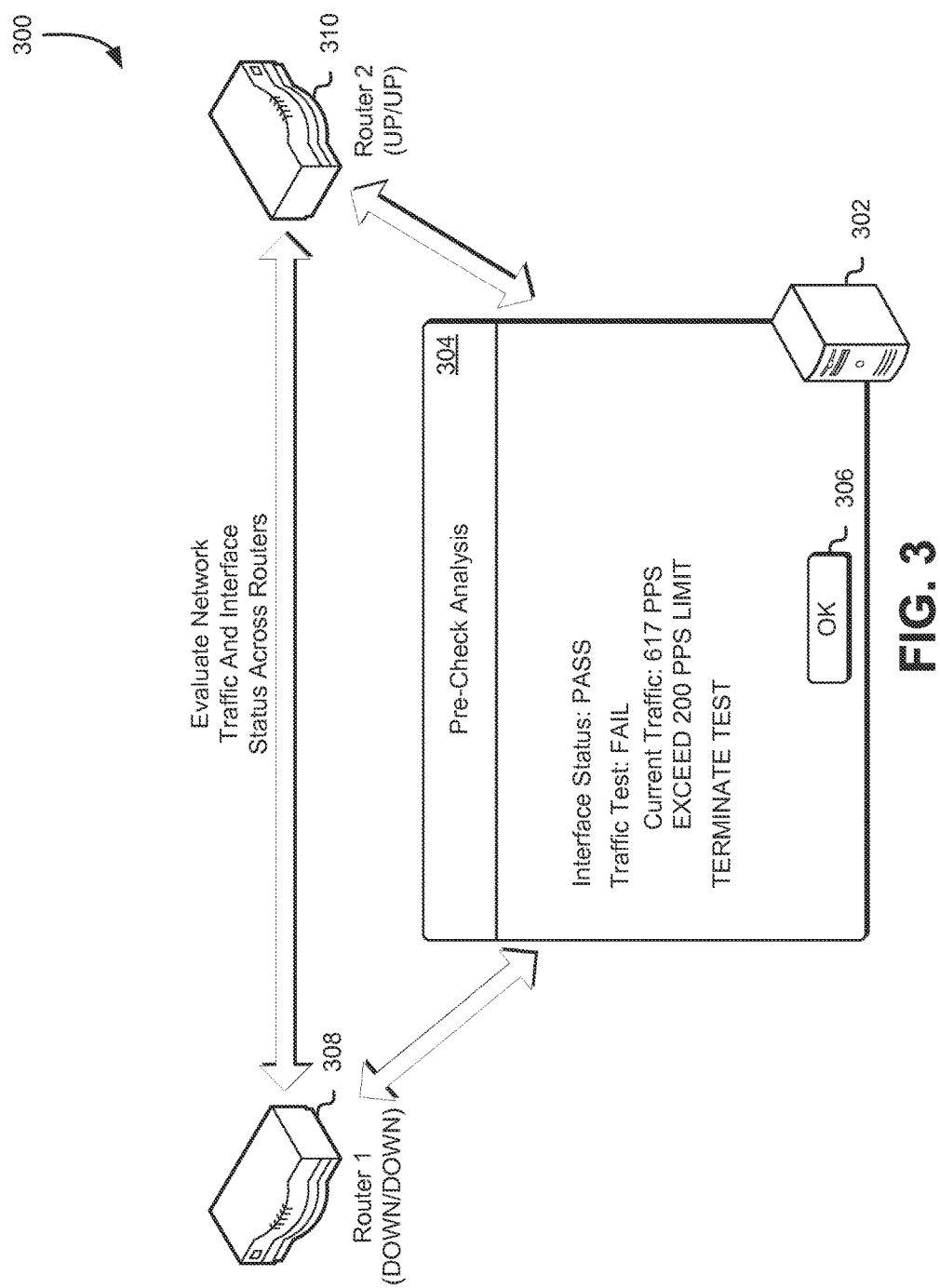
FIG. 3 shows an illustrative example of an environment in which a bastion server performs one or more pre-check analyses based at least in part on tests specified within a test plan according to at least one embodiment.

As noted above, when a bastion server receives a test plan from a user client device, the bastion server may select a first set of network devices for which a connection between these network devices is to be tested. Subsequently, the bastion server may utilize the test plan to initiate execution of a pre-check phase to ensure that this connection may be tested successfully. Accordingly, FIG. 3 shows an illustrative example of an environment 300 in which a bastion server 302 performs one or more pre-check analyses based at least in part on tests specified within a test plan according to at least one embodiment. In the environment 300, the bastion server 302 has selected a connection between network device 308 and network device 310 for analysis based at least in part on information specified within the network topology service. The bastion server 302 may include an interface 304, which may enable a network administrator or other network technician/engineer to follow the progress of the pre-check phase of the test plan through his/her user client device. Alternatively, the information included within the interface 304 may be provided to the user client device upon completion or termination of the test plan.

During the pre-check phase of the test plan, the bastion server 302 may perform an interface status analysis to determine the current state of the network device interfaces for network device 308 and network device 310. For instance, as illustrated in FIG. 3, the network device interfaces for the network devices 308, 310 may be set to "UP/UP," which may indicate that the interface and the link are both operating. If an interface status is set to "UP/DOWN," this may indicate that the interface should be operational but no link has been detected. This may denote an issue with the connection or the interface itself. If the interface status is set to "DOWN/DOWN," the interface may be offline due to an administrator request or the interface has not been activated. This particular status may not necessarily denote an issue with the interface or the connection. If the bastion server 302 determines that any interfaces have an issue, the bastion server 302 may terminate the test and inform the network administrator through the interface 304 that there is an issue with an interface.

Figure 8:
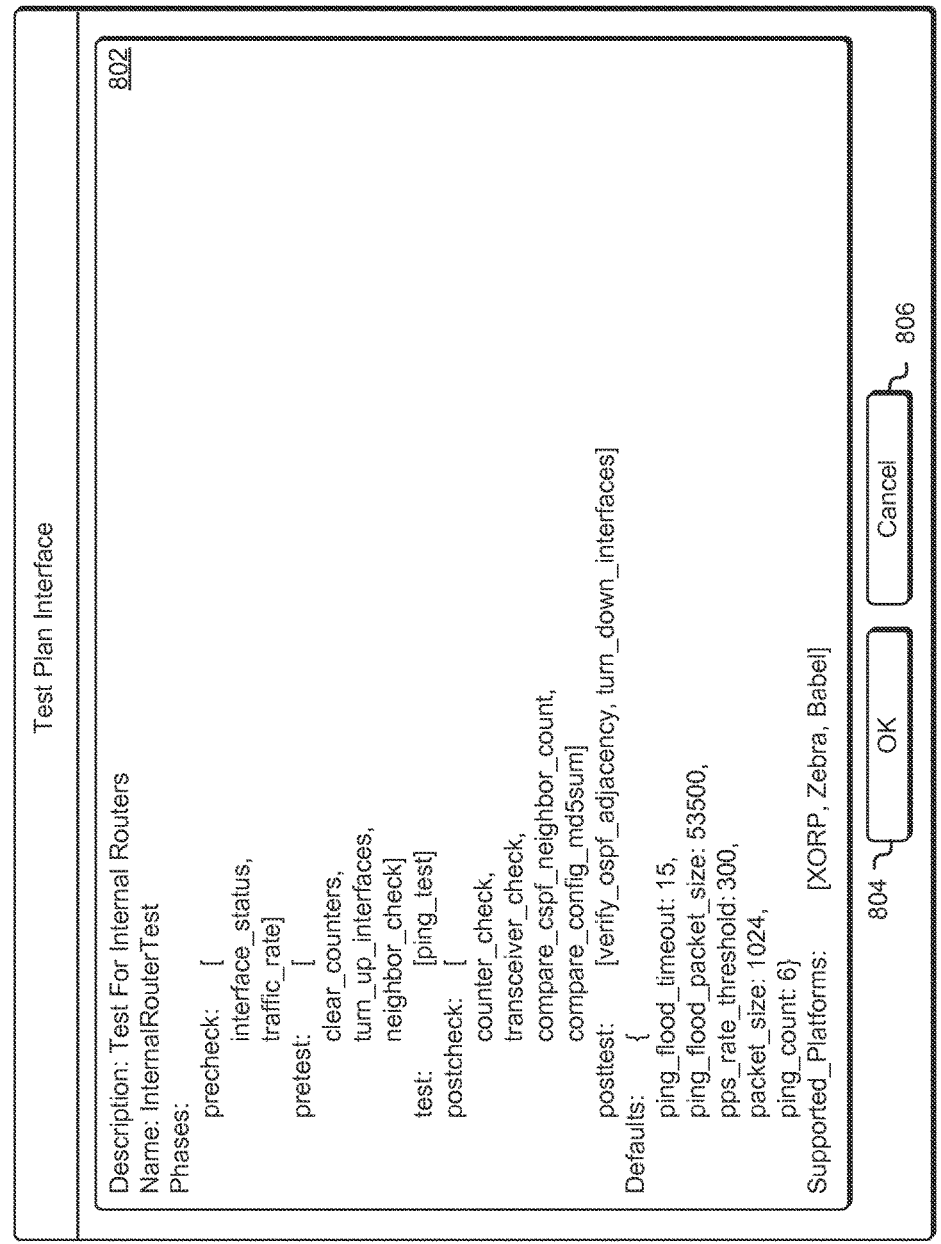
FIG. 8 shows an illustrative example of a test plan interface usable to generate a test plan comprising instructions for performing one or more tests and analyses on network hardware in accordance with at least one embodiment.

If the network devices 308, 310 successfully pass the interface status test, the bastion server 302 may perform a network traffic test to determine the amount of network traffic transmitted over the connection between the network devices 308, 310 and whether disruption of this connection may result in significant impact of the network. The test plan may include a default maximum network traffic threshold, which may be modified by the network administrator through the test plan interface, as illustrated in FIG. 8. If the network traffic for the connection exceeds this maximum network traffic threshold, the connection may fail the network traffic test, causing the bastion server 302 to terminate the test and inform the network administrator through the interface 304 that there is too much network traffic to remove the connection from service and perform additional tests. For instance, as illustrated in FIG. 3, the network traffic test has resulted in a failure as the network traffic detected exceeds the 200 packets per second threshold defined in the test plan. Thus, the bastion server 302 has terminated the test and has provided the network administrator with a button 306 in the interface 304 to exit the interface 304.

Figure 4:
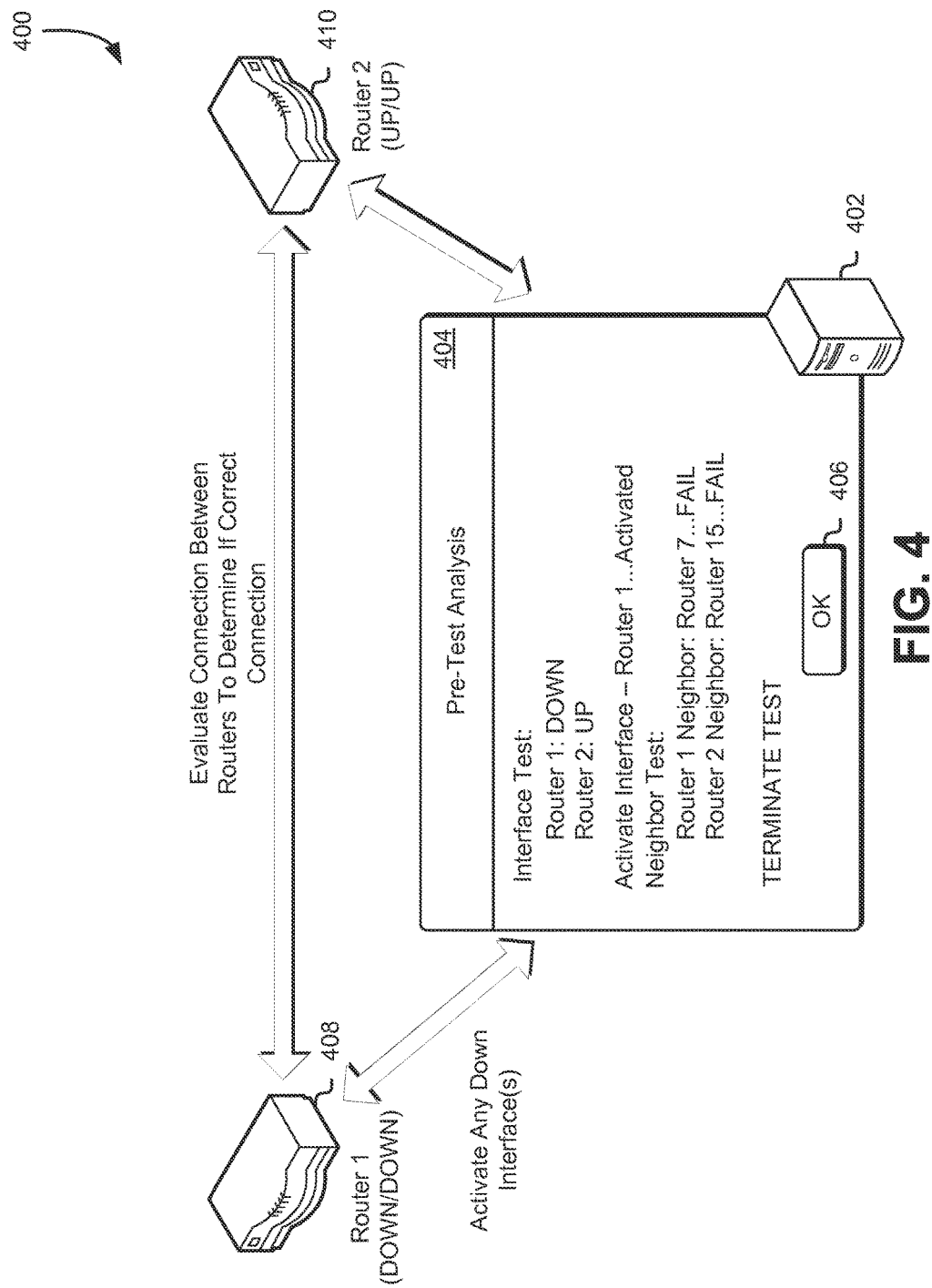
FIG. 4 shows an illustrative example of an environment in which a bastion server performs one or more pre-test analyses based at least in part on tests specified within a test plan according to at least one embodiment.

Once the bastion server has completed the pre-check phase of the test plan, the bastion server may next perform any tests and analyses specified within the pre-test phase of the test plan. The pre-test phase may enable the bastion server to identify any other issues that may affect execution of the test phase of the test plan. Thus, any failures identified through the pre-test phase may also result in the bastion server terminating the test plan, as a potential issue with the network devices or the connection between these devices may impact the performance of the network or not render useful results. Accordingly, FIG. 4 shows an illustrative example of an environment 400 in which a bastion server 402 performs one or more pre-test analyses based at least in part on tests specified within a test plan according to at least one embodiment.

As part of the pre-test phase of the test plan, the bastion server 402 may identify any interfaces of the network device pair that may be offline. For instance, as illustrated in FIG. 4, the interface for network device 408 (e.g., "Router 1") may initially be offline (e.g, "DOWN/DOWN"). If the bastion server 402 identifies an offline interface for the network device 408, the bastion server 402 may transmit a request to the network device with the offline interface to activate the interface for testing. The bastion server 402 may wait a period of time to enable the network device 408 to activate the interface and establish a connection with the other network device 410 through the physical connection between these network devices 408, 410. After this period of time has passed, the bastion server 402 may either receive a notification from the network device 408 that the interface has been activated and the connection established or the bastion server 402 may transmit a second request to the network device 408 to determine whether the interface has been activated. If the network device 408 is unable to activate the interface, the bastion server 402 may terminate the test plan, as the connection between the network devices 408, 410 may be disabled and there may be an issue with the network device 408.

If the network devices 408, 410 pass the interface test and the interfaces are active, the bastion server 402 may perform a network device neighbor test to determine whether the interfaces for the network devices 408, 410 are correctly connected to one another. For instance, the bastion server 402 may transmit a request to a network device 408 to determine which neighbor is specified with the route table for the particular interface being tested. If the network device 408 returns with an interface identifier that does not correspond to the interface of the other network device 410 of the network device pair, this may serve as an indication that the connection between the network devices 408, 410 is incorrect. The bastion server 402 may transmit a similar request to the other network device 410 to identify the intended neighbor for its interface and determine whether the physical connection is correct from its end. This may enable the bastion server 402 to identify any issues with the physical connection and/or the interfaces that need to be addressed to ensure that the physical connections are made properly. Thus, if the network devices 408, 410 fail the neighbor test, as illustrated in FIG. 4, the bastion server 402 may terminate the test plan and inform the network administrator, through the bastion server interface 404, the nature of the issue between the network devices 408, 410. The bastion server 402 may further provide, through the interface 404, a button 406 usable to exit the bastion server interface 404.

Figure 5:
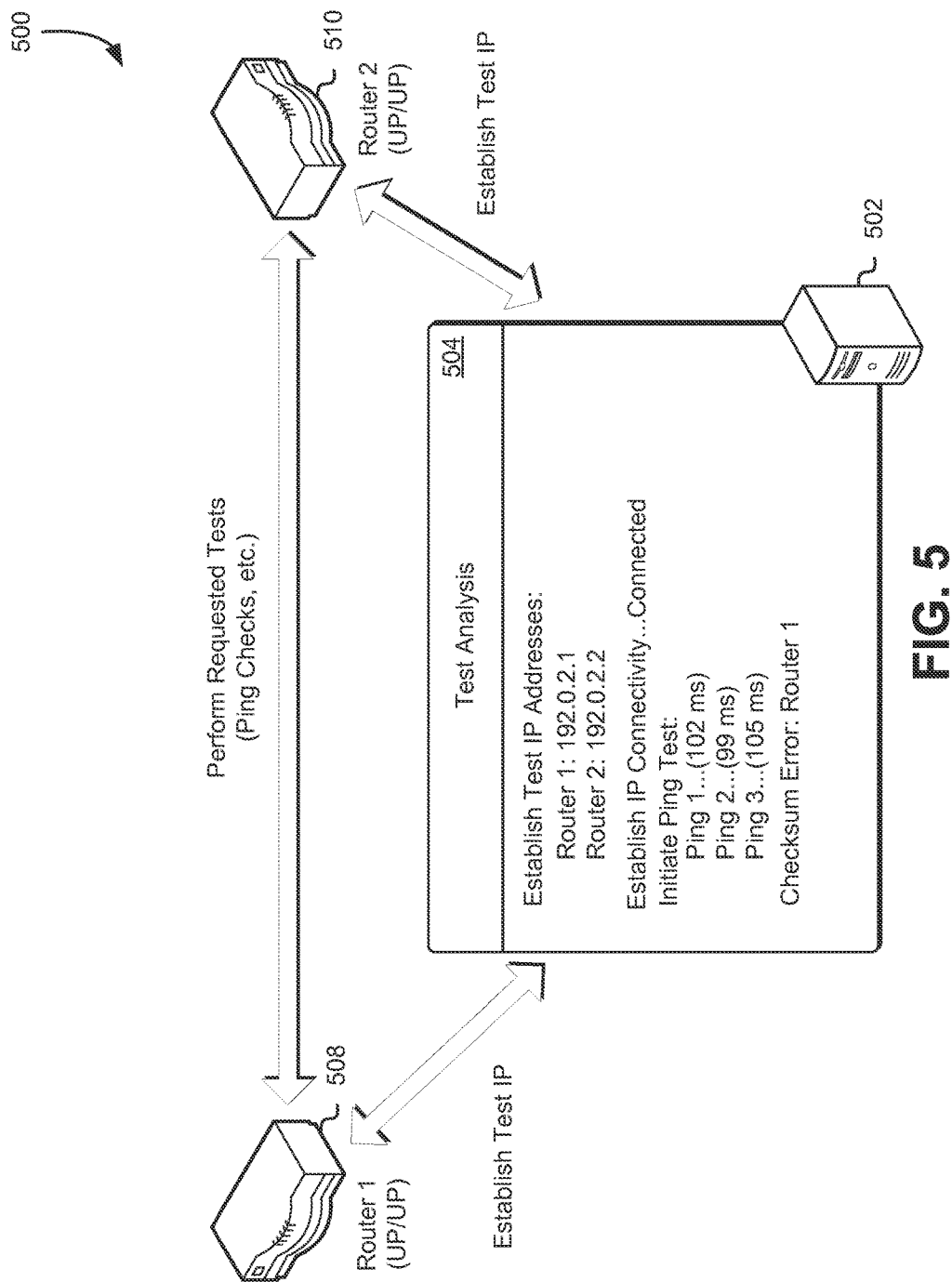
FIG. 5 shows an illustrative example of an environment in which a bastion server performs one or more tests based at least in part on tests specified within a test plan according to at least one embodiment.

If the bastion server is able to successfully complete the pre-check and pre-test phases of the test plan without any errors or failures on the part of the network devices or the connection between the network devices, the bastion server may initiate the test phase of the test plan and perform any tests and analyses specified by the network administrator or other network technician/engineer in the test plan. Accordingly, FIG. 5 shows an illustrative example of an environment 500 in which a bastion server 502 performs one or more tests based at least in part on tests specified within a test plan according to at least one embodiment. In order to perform the various tests and analyses specified within the test phase of the test plan, the bastion server 502 may transmit a request to each network device 508, 510 to assign a test-specific IP address to the network device and establish an IP connection using these newly assigned test-specific IP addresses. The bastion server 502 may cause the network devices 508, 510 to transmit a set of data packets through the connection to ensure that the connection has been established properly and that the subsequent tests may be performed.

Once the IP connection has been established between the network devices 508, 510, the bastion server 502 may perform the one or more tests and analyses specified within the test plan. For instance, as illustrated in FIG. 5, the bastion server 502 may perform a ping test across the IP connection, whereby a certain number of packets are transmitted from network device 508 to network device 510 and vice versa. Each network device 508, 510 may record the amount of time needed to receive the number of packets from the opposite network device, as well as any issues that may arise during transmission or receiving of the data packets (e.g., checksum errors, data packet loss, etc.). This ping test may be performed a certain number of times, as specified within the test plan, in order to obtain multiple data points for the test. This may enable the network administrator to identify any trends and potential issues. For each test performed, the bastion server 502 may record the results of these tests and present the results to the network administrator through the bastion server interface 504 as the results are provided to the bastion server 502 by the network devices 508, 510. Further, each network device 508, 510 may keep track of any errors encountered during execution of these tests in the form of counters, which will be described in greater detail below. Any errors may also be specified within the bastion server interface 504 as they are encountered. Unlike the pre-check and pre-test phases, if any errors are identified during the test phase, the bastion server 502 may continue execution of the test plan.

Figure 6:
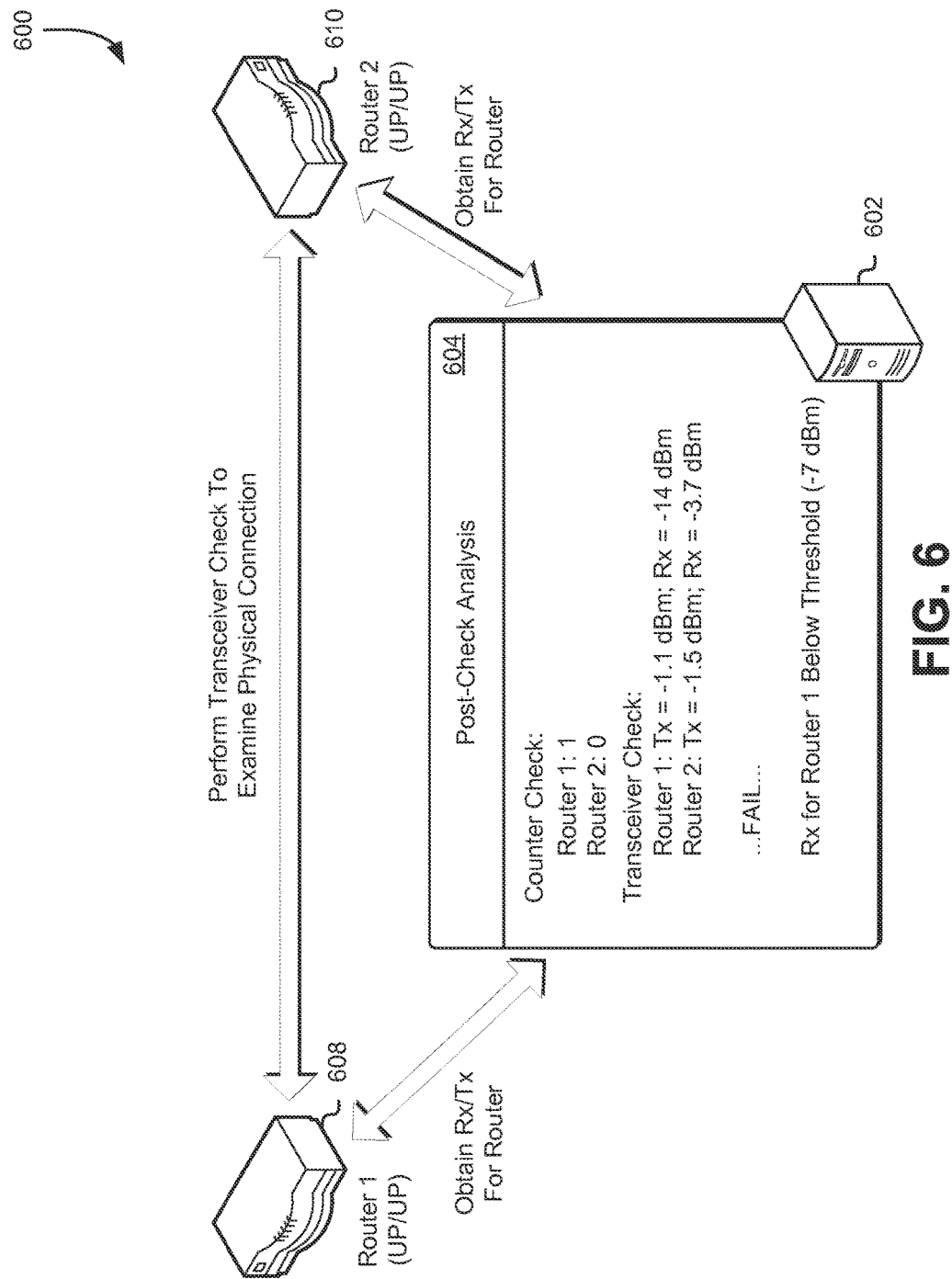
FIG. 6 shows an illustrative example of an environment in which a bastion server performs one or more post-check analyses based at least in part on tests specified within a test plan according to at least one embodiment.

Upon completion of all the tests and analyses specified within the test phase of the test plan, the bastion server may transmit a request to each network device to reset their respective IP addresses to the IP addresses previously assigned to the network devices prior to testing. Subsequently, the bastion server may execute the post-test phase of the test plan. Accordingly, FIG. 6 shows an illustrative example of an environment 600 in which a bastion server 602 performs one or more post-check analyses based at least in part on tests specified within a test plan according to at least one embodiment. As part of the post-check phase of the test plan, the bastion server 602 may transmit a request to each network device 608, 610 to obtain the number of counters for the network device 608, 610. For instance, if a network device 608, 610 encounters CRC errors, hardware errors, symbol errors or any other kind of errors, the network device 608, 610 may record each error through an interface counter. The interface counter may increment as a new error is detected. Thus, a higher interface counter may denote a greater occurrence of errors within the network device 608, 610. The bastion server 602, upon receiving the interface counter from each network device 608, 610, may record this interface counter for inclusion within the test plan summary and provide the interface counter through the bastion server interface 604.

In addition to obtaining the interface counters from each network device 608, 610, the bastion server 602 may perform one or more transceiver tests of the physical connection between the network devices 608, 610 to determine whether there are any issues with the connection. For instance, the bastion server 602 may transmit a request to each network device 608, 610 to obtain the signal strength of the signal transmitted through the interface port (e.g., Tx) and the signal strength of the signal received through the interface port (e.g., Rx). If, as illustrated in FIG. 6, the signal strength for any network device 608, 610 is below a threshold defined within the test plan, the bastion server 602 may record this error and notify the network administrator through the bastion server interface 604 of the discovered transceiver error within the affected network device (e.g., Router 1, as illustrated in FIG. 6). As with the tests performed as part of the test phase, any failures or errors encountered during the post-check phase may not cause the bastion server 602 to terminate the test plan.

Figure 7:
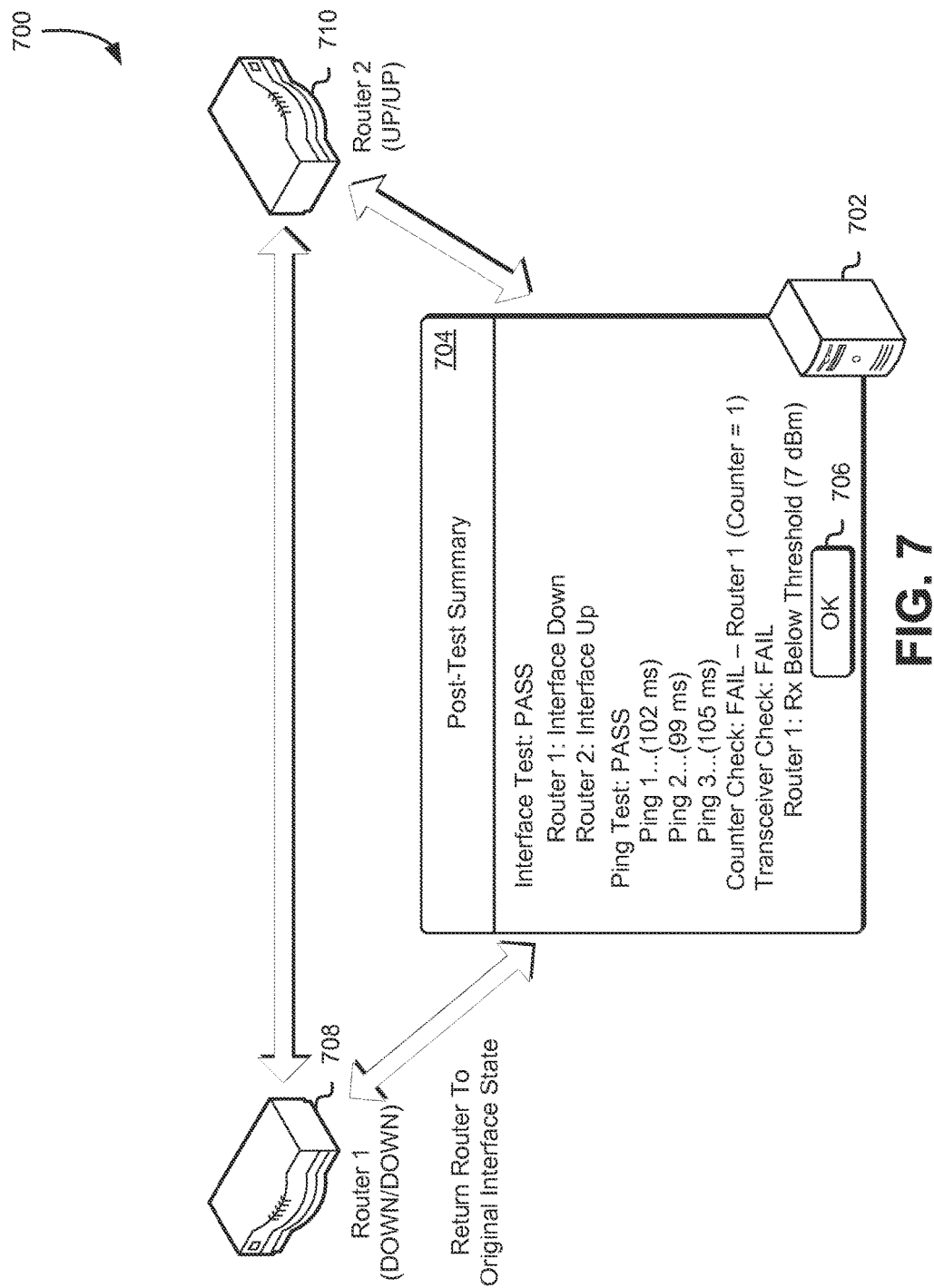
FIG. 7 shows an illustrative example of an environment in which a bastion server provides the results of the tests and analyses performed based at least in part on the provided test plan and returns network hardware to their original configuration prior to testing in accordance with at least one embodiment.

The bastion server, upon completion of the post-check phase of the test plan, may execute the post-test phase of the test plan, which may include returning the network devices to their original states prior to execution of the test plan and reporting the results of the various tests and analyses performed by the bastion server to the network administrator. Accordingly, FIG. 7 shows an illustrative example of an environment 700 in which a bastion server 702 provides the results of the tests and analyses performed based at least in part on the provided test plan and returns network hardware to their original configuration prior to testing in accordance with at least one embodiment. In the environment 700, upon completion of the post-check phase of the test plan, the bastion server 702 may transmit a request to the network devices 708, 710 to return the tested interfaces to their original configuration prior to execution of the test plan. For instance, as illustrated in FIG. 7, the interface for network device 708 (e.g., Router 1) has been taken offline (e.g., "DOWN/DOWN") by the network device 708 in response to a request from the bastion server 702 and the original interface configuration prior to testing (see FIG. 4).

In addition to returning the network devices 708, 710 to their original configurations prior to testing, the bastion server 702 may compile the results of the various tests and analyses performed as part of the execution of the test plan and prepare a test summary for the network administrator. For instance, the bastion server 702 may present the test summary to the network administrator through use of the bastion server interface 704. Additionally, the bastion server interface 704 may provide the network administrator with a button 706 usable to exit the bastion server interface 704 when he/she is done reviewing the test summary. In an alternative embodiment, the bastion server 702 will transmit the completed test summary to the user client device connected to the bastion server 702. This may enable the network administrator or other user of the user client device to review the test summary at his/her own convenience without depending on connectivity with the bastion server 702. In addition, the bastion server 702 may transmit the test summary to the network topology service, where the test summary may be stored and catalogued for later access. Thus, a network administrator or other network technicians/ engineers may access the network topology service to obtain various test summaries for various network device pairs within the network and compile the results to obtain a composite understanding of the network state.

In an embodiment, if the bastion server 702 identifies any test failures that may require technical support in order to restore full functionality of the connection between the tested interfaces, the bastion server 702 will transmit a request to the network devices 708, 710 to update their respective route tables to reduce or otherwise avoid transmitting data packets through this connection until the connection is repaired successfully. For instance, if the network devices 708, 710 utilize the OSPF protocol, the network devices 708, 710 may adjust the weight assigned to the affected connection within the route table to reduce the possibility of network traffic being routed through this affected connection. If, at a later time, the bastion server 702 determines that the affected connection has been restored and presents no new errors or failures, the network devices 708, 710 may revise their respective route tables to assign the original weight to the connection and restore network traffic along the connection.

As noted above, a network administrator or other network technician/engineer may use a user client device or other computing device to access and use a test plan interface to establish a test plan that may be used to test and analyze physical connections between various networking devices within a distributed network. The test plan interface may enable the administrator to generate a test plan by describing certain steps to be performed during various stages of testing a link between various network devices, as well as defaults values for these steps and supported platforms for any network devices that are to be tested. Accordingly, FIG. 8 shows an illustrative example of a test plan interface 800 usable to generate a test plan comprising instructions for performing one or more tests and analyses on network hardware in accordance with at least one embodiment.

The test plan interface 800 may include a test plan editor window 802, which a network administrator or other network technician/engineer may utilize to define a test plan for a particular network or network devices and connections within the network. When a network administrator or other network technician/engineer accesses the test plan interface 800, the test plan interface 800 may present, through the test plan editor window 802, a default test plan. This default test plan may include the various stages of the test plan (e.g., pre-check, pre-test, test, post-check, post-test) as well as default tests and analyses that may be performed for each stage of the test plan. These stages, tests and analyses specified within the default test plan may be required in order to ensure that the test plan is executed properly or is terminated in the event that the selected network device pair cannot be utilized for tests specified within the test phase of the test plan. In some embodiments, when the network administrator or other network technician/engineer accesses the test plan interface 800, the test plan editor window 802 may not include any information, thereby requiring the network administrator or other network technician/engineer to generate the entire test plan manually.

The test plan specified within the test plan editor window 802 may be constructed using one or more programming languages (e.g., Python, C++, Java, Fortran, Basic, etc.) supported by the bastion server provided by the computing resource service provider or other service provider. Each test and analysis specified for each test plan phase may need to be associated with a programming library available to the bastion server. For instance, if the test plan includes "interface_status" under the pre-check phase, as illustrated in FIG. 8, the bastion server must be able to identify the interface status programming library and obtain various command lines from the programming library to enable the bastion server and the network devices being tested to perform the interface status test. If a test or analysis is not recognized by the bastion server, the bastion server may return an error message indicating that the requested test could not be recognized. In some embodiments, when the network administrator or other network technician/engineer has created his/her test plan through use of the test plan editor window 802 and selects the OK button 804 to submit the test plan, the test plan interface 800 may evaluate the provided the test plan to ensure that the test plan includes the necessary test plan phases, the test and analysis commands within these test plan phases are recognizable by the bastion server, and that the supported platforms have been defined. If any errors are identified, the test plan interface 800 may utilize the test plan editor window 802 to highlight the portions of the provided test plan that have resulted in an error.

Through the test plan editor window 802, the network administrator or other technician/engineer may further specify a set of default values and thresholds for the various tests and analyses specified within the test plan. For example, as illustrated in FIG. 8, the "Defaults" portion of the test plan specifies that the "pps_rate_threshold" is set to 300. This means that if the network traffic during the "traffic_rate" test specified in the pre-check phase of the test plan exceeds 300 packets per second, the network device pair would fail this test, causing the bastion server to terminate execution of the test plan. As another example, as illustrated in FIG. 8, the "Defaults" portion of the test plan specifies that the "ping_count" is set to 6. This may serve as an input to the "ping_test" specified within the test phase of the test plan and may denote the number of times a ping test is performed between the network devices to determine the amount of time elapsed to transmit a certain number of packets.

Once the network administrator or other network technician/engineer has completed using the test plan editor window 802 to create a new test plan, he/she may select the OK button 804 to submit the test plan for use by a bastion server for testing various network devices within a particular network. For instance, the test plan interface 800 may store the completed test plan within a user client device and, upon connection to the bastion server, provide the completed test plan to the bastion server. This may enable the bastion server to initiate execution of the provided test plan. If the network administrator or other network technician/engineer does not want to incorporate the changes introduced within the test plan editor window 802, he/she may select the cancel button 806 to terminate the test plan interface 800 without submitting the test plan for use. In some embodiments, the test plan interface 800 will include functionality to enable the network administrator or other network technician/engineer to store a test plan without submitting the test plan for use by the bastion server. This may enable the network administrator or other network technician/engineer to access the test plan at a later time and make any modifications prior to submitting the test plan for use.

Figure 9:
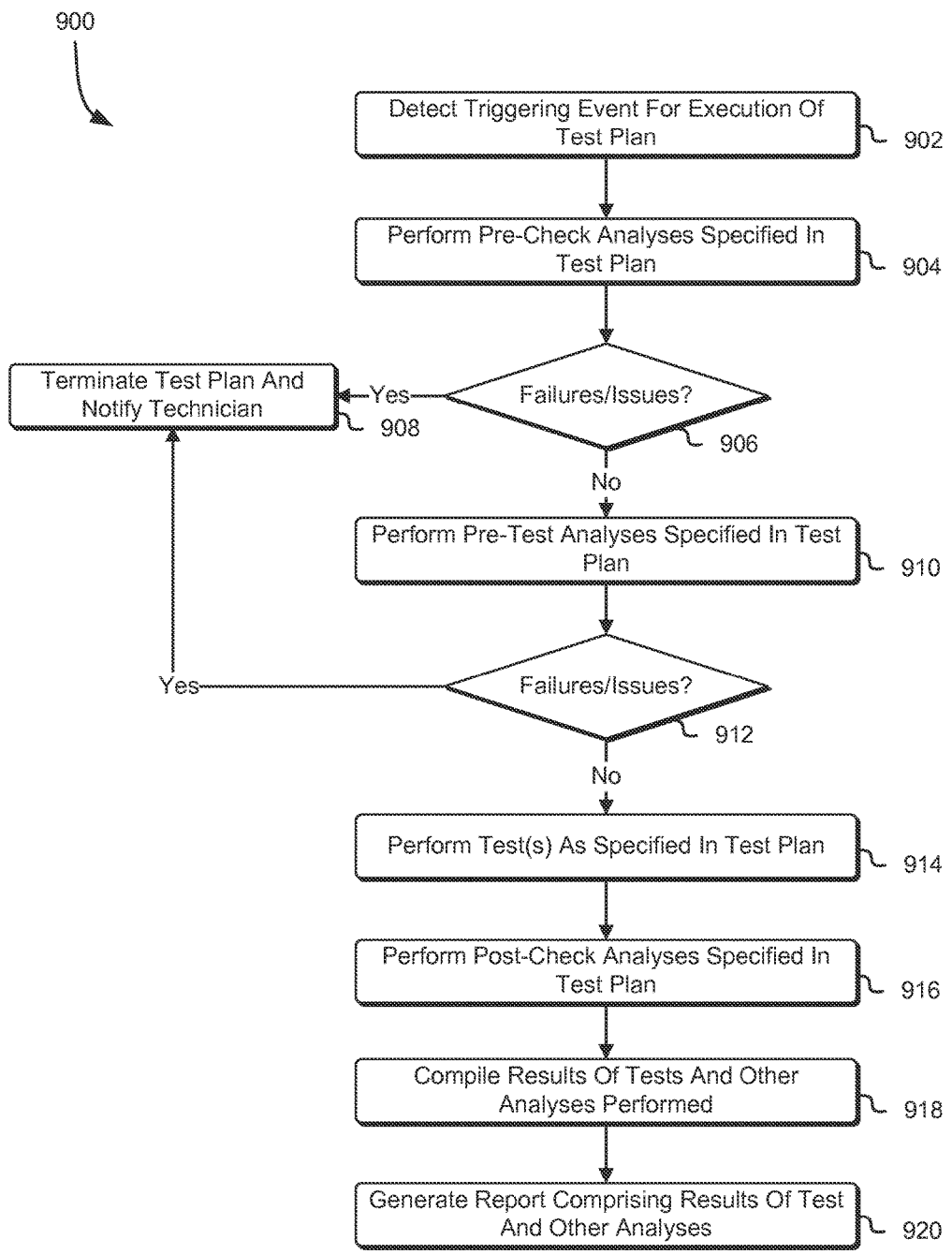
FIG. 9 shows an illustrative example of a process for executing a test plan received from a user client and providing the results of the tests and analyses of the test plan in accordance with at least one embodiment.

As noted above, a bastion server may obtain, from a user client device, a test plan that includes various tests and analyses that are to be performed in order to evaluate various network devices and connections within a distributed network. This test plan may be separated into various phases, each of which may include certain tests and analyses usable to identify any potential issues within a selected network device pair and the connection between the network devices of this pair. Accordingly, FIG. 9 shows an illustrative example of a process 900 for executing a test plan received from a user client device and providing the results of the tests and analyses of the test plan in accordance with at least one embodiment. The process 900 may be performed by the aforementioned bastion server, which may be configured to access one or more programming libraries to identify, based at least in part on commands specified within the test plan, one or more operations to be performed to test and analyze the network devices and connection that has been selected for evaluation. Additionally, the bastion server may be configured to obtain and compile any information obtained from the network devices, which may be provided to a network administrator or other network technician/engineer through a user client device.

At any time, the bastion server may detect 902 a triggering event which may cause the bastion server to begin execution of a test plan. For instance, when a user client device is connected to the bastion server, the user client device may transmit a test plan to the bastion server that is to be used to evaluate the various network device pairs within a particular network. This may cause the bastion server to access a network topology service to identify a network device pair and initiate execution of the test plan. Alternatively, the bastion server may execute a test plan on a new network device pair upon completion of an evaluation of a different network device pair within the network. Thus, the execution of the test plan may be a continuation of the network evaluation being performed by the bastion server on behalf of a network administrator or other network technician/engineer that has provided the test plan through the user client device.

The bastion server, upon initiating execution of the test plan, may perform 904 any pre-check analyses specified within the test plan. For instance, as illustrated in FIG. 3, the bastion server may transmit a request to each network device currently being tested to obtain the status of the interfaces used for the connection between these network devices. If any interfaces are offline due to an issue with an interface or the physical connection, the affected network device may report, to the bastion server, an interface status test failure. However, if an interface is offline due to an administrative request, this may not be considered a failure for the purpose of the interface status test and the network device may not return an interface status test failure. In addition to the interface status test, the bastion server may perform a network traffic test to determine whether the network traffic through the physical connection exceeds a threshold defined within the test plan. For instance, the bastion server may transmit a request to each network device to determine the amount of network traffic being received by each network device. This information may be used to determine the total network traffic across the physical connection. If the network traffic exceeds the specified threshold within the test plan, the bastion server may determine that this network device pair has failed the network traffic test. However, if the network traffic is below this threshold, the network device pair may be deemed as having passed this test.

Based at least in part on the results of the various tests and analyses performed as part of the pre-check phase of the test plan, the bastion server may determine 906 whether any test failures or issues have been detected. If the network device pair being tested fails any portion of the pre-check phase of the test plan, the bastion server may terminate 908 the test plan and notify the network administrator or network technician/engineer of the discovered issue with the network device pair and/or the physical connection between the pair. However, if the network device pair and the connection between these network devices pass the pre-check phase of the test plan, the bastion server may execute the pre-test phase of the test plan and perform 910 any pre-test tests and analyses specified in the test plan. For instance, as illustrated in FIG. 4, if an interface is offline, the bastion server may transmit a request to the affected network device to activate the offline interface. If the network device is unable to successfully activate the offline interface, the network device may return an error, which may result in failure of the pre-test phase of the test plan.

If the offline interfaces are activated as part of the pre-test phase, the bastion server may subsequently perform a neighbor test to determine whether the physical connection between the network devices is correct. For instance, the bastion server may transmit a request to a network device of the network device pair to specify the intended neighbor for the interface. If the intended neighbor does not match the identifier for the interface of the other network device of the network device pair, then the physical connection may have been installed incorrectly, resulting in an error. This, in turn, may result in a neighbor test failure. Once the pre-test phase of the test plan has been completed, the bastion server may determine 912 whether any test failures or issues have been detected. If the network device pair being tested fails any portion of the pre-test phase of the test plan, the bastion server may terminate 908 the test plan and notify the network administrator or network technician/engineer of the discovered issue with the network device pair and/or the physical connection between the pair.

If the bastion server is able to successfully complete the pre-check and pre-test phases of the test plan, the bastion server may perform 914 the one or more tests specified within the test phase of the test plan. In order to execute the test phase of the test plan, the bastion server may transmit a request to each network device to assign a test-specific IP address to each network device and establish IP connectivity over the network connection between these network devices in order to perform the various tests specified in the test phase of the test plan. Once IP connectivity has been established, the bastion server may transmit any commands to the network devices associated with the specified tests within the test phase of the test plan and obtain any results produced by these network devices as they are produced. Unlike the pre-check and pre-test phases of the test plan, if the bastion server detects any failures and/or issues with any of the tests of the test phase of the test plan, the bastion server may record these failures and/or issues for later reporting to the network administrator.

Upon completion of the test phase of the test plan, the bastion server may perform 916 any tests and analyses specified within the post-check phase of the test plan. For instance, as illustrated in FIG. 6, the bastion server may obtain, from each network device of the network device pair, the number of interface counters generated as a result of errors encountered during testing. For instance, a network device may increment the interface counters for any CRC errors, hardware errors, symbol errors or another errors encountered by the network device through the particular interface being analyzed. In addition to obtaining the number of interface counters from the network devices, the bastion server may perform one or more transceiver tests to identify any potential issues with the physical connection (e.g., signal strength, cable fidelity, ports, etc.) between the network devices of the network device pair. For instance, the bastion server may transmit a request to each network device to determine the signal strength of a transmission to another network device (Tx) and the signal strength of a signal being received through the interface (Rx). The bastion server may obtain these values from the network devices and compare these values to the default signal strength threshold specified within the test plan to determine whether these network devices pass the transceiver test. The bastion server may record the results of the transceiver test, as well as any other tests performed as part of the post-check phase for later reporting. Additionally, the bastion server may transmit a request to the network devices to reset the IP addresses for the network devices. This may replace the test-specific IP addresses assigned to the network devices as part of the test plan with the original IP addresses assigned prior to execution of the test plan.

Once the bastion server has completed the post-check phase of the test plan, the bastion server may perform execute the post-test phase of the test plan and compile 918 the results of the various tests and analyses performed as part of the test plan to generate 920 a report that includes these results. For instance, the bastion server may generate a comprehensive report that includes the results of each test and analysis performed as part of execution of the test plan. This report may be transmitted to the user client device connected to the bastion server, thus enabling a user of the client device (e.g., network administrator, network technician, etc.) to review the report and address and issues, failures and/or errors identified within the report. Additionally, or alternatively, the bastion server may transmit the report to a network topology service where the report may be catalogued and stored for later use. Thus, network administrators may access the network topology service to access any test plan reports as needed.

Figure 10:
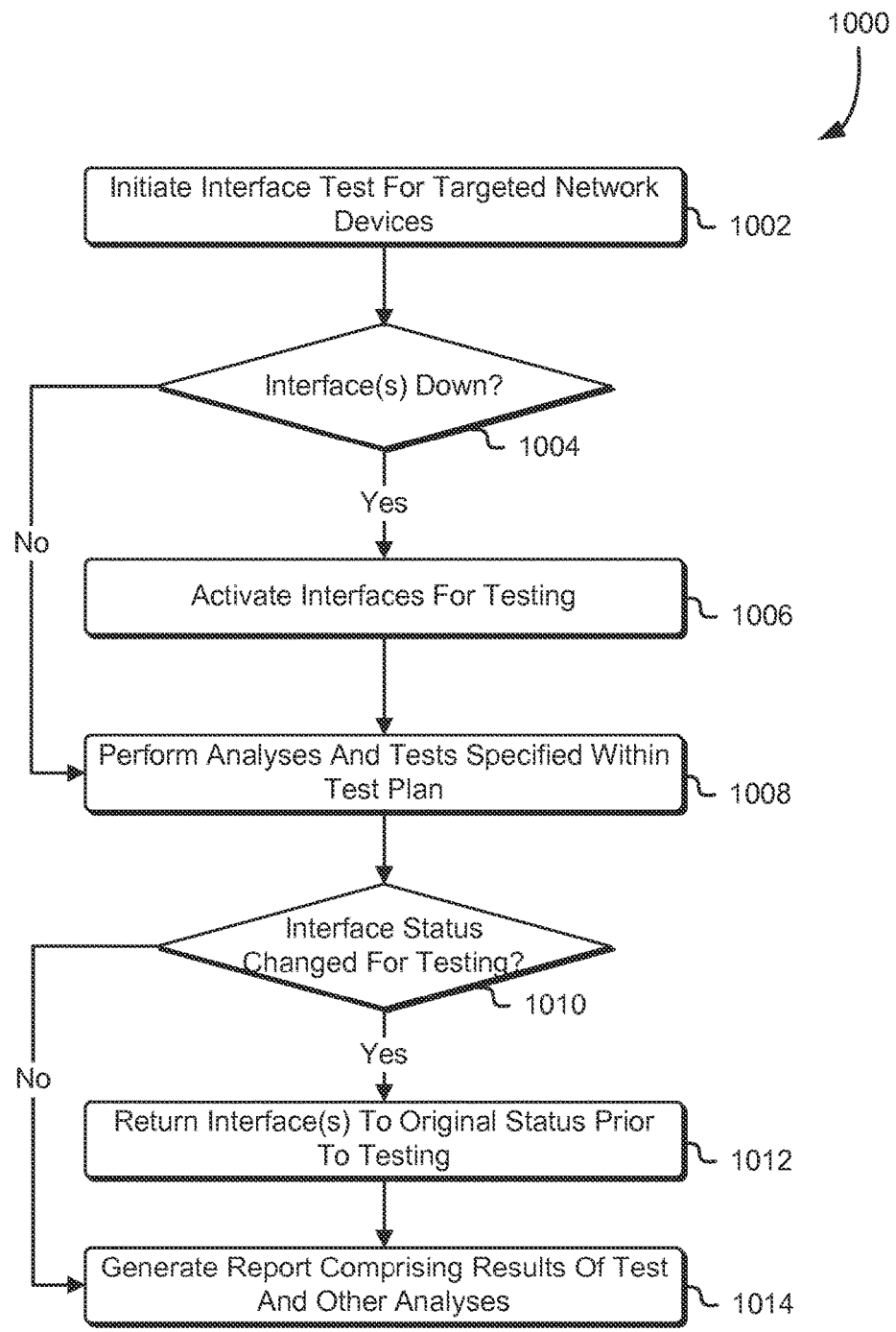
FIG. 10 shows an illustrative example of a process for activating one or more router interfaces to enable execution of a received test plan in accordance with at least one embodiment.

In some embodiments, once the test plan has been successfully executed and completed, the bastion server may transmit a request to each network device to restore the original configuration of the network device interfaces prior to execution of the test plan. As noted above, these interfaces may have been activated as part of the test plan in order to conduct one or more tests and analyses to evaluate the network connection between the network devices. Accordingly, FIG. 10 shows an illustrative example of a process 1000 for activating one or more router interfaces to enable execution of a received test plan in accordance with at least one embodiment. The process 1000 may be performed by the aforementioned bastion server, which may be configured to transmit requests and commands to one or more network devices selected as part of a test plan for evaluation.

As noted above, the bastion server may initiate 1002 an interface test for the targeted network devices of a network device pair. This interface test may be part of the pre-test phase of the test plan and may be conducted if these network devices have successfully passed the pre-check phase of the test plan. For instance, as part of the pre-check phase of the test plan, the bastion server may transmit a request to each network device currently being tested to obtain the status of the interfaces used for the connection between these network devices. If any interfaces are offline due to an issue with an interface or the physical connection, the affected network device may report, to the bastion server, an interface status test failure. However, if an interface is offline due to an administrative request, this may not be considered a failure for the purpose of the interface status test and the network device may not return an interface status test failure.

Through the interface test, the bastion server may determine 1004 whether any of the interfaces being tested are currently down (e.g., offline) due to an administrative request. If any of the interfaces are offline, the bastion server may transmit a request to the affected network devices to activate 1006 these offline interfaces for testing. The bastion server may wait an allotted period of time before transmitting a request to determine whether the interfaces have been activated or not. If the interfaces have been activated or no interfaces were offline prior to initiation of the pre-test phase of the test plan, the bastion server may perform 1008 any analyses and tests specified within the test plan and obtain any results from the network devices as they are produced.

Once the bastion server has completed the various analyses and tests specified within the test plan, the bastion server may determine 1010 whether the status of any interface was changed during the pre-test phase to enable testing of the interfaces, network devices and the physical connection in accordance with the test plan. If an interface was activated in order to perform the tests and analyses specified within the test plan, the bastion server may transmit a request to the affected network device to return 1012 the interface to its original status prior to execution of the test plan. Thus, if an interface was previously offline (e.g., "DOWN/DOWN" as illustrated in FIG. 4), the network device, upon receiving the request from the bastion server, may return the interface to its original offline status. Upon returning the affected interfaces to their original status, or if the statuses for the interfaces were not changed as part of the test plan, the bastion server may generate 1014 the report comprising the results of the various tests and other analyses specified within the test plan, as described above in connection with FIG. 9.

Figure 11:
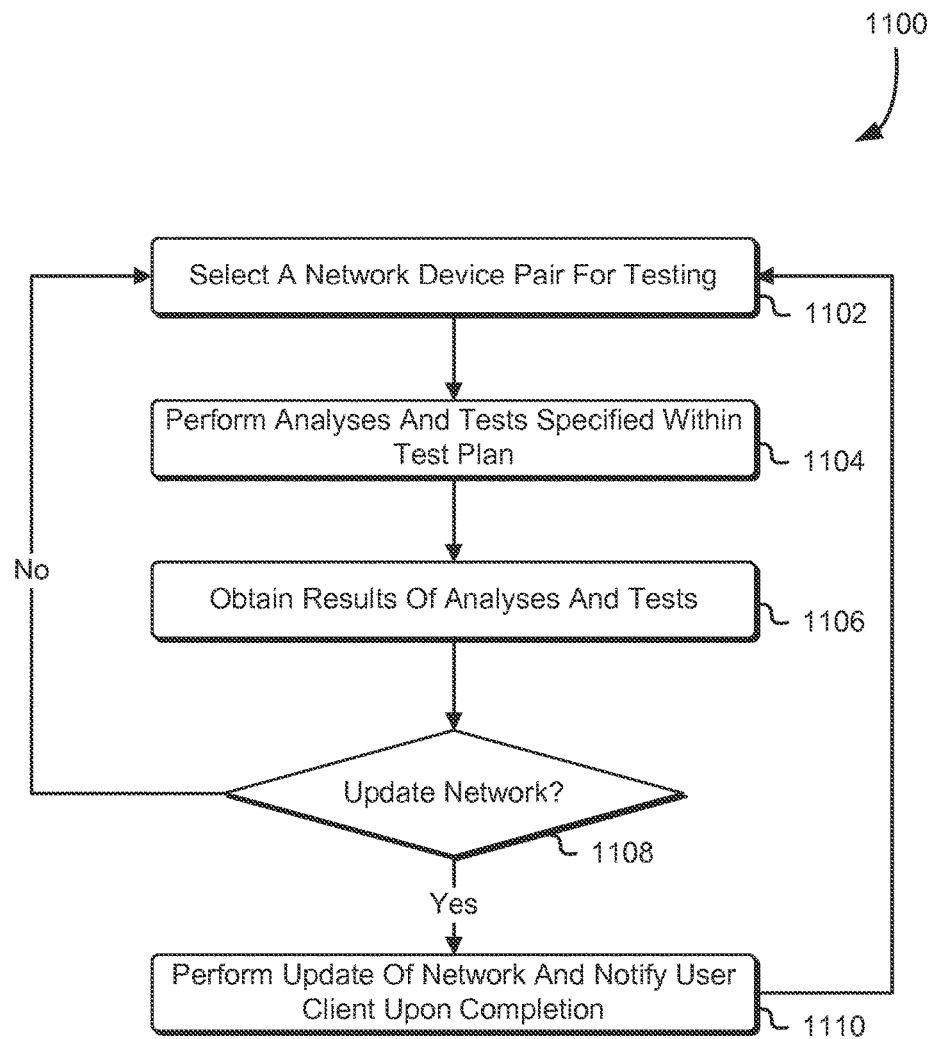
FIG. 11 shows an illustrative example of a process for updating network topology in response to obtained results stemming from an executed test plan in accordance with at least one embodiment.

As noted above, if the bastion server identifies any failures, errors, or other errors with the network devices during execution of the test plan, the bastion server may transmit a request to the affected network devices to update their associated route tables to limit or otherwise restrict network traffic through the connection between these network devices. For instance, if the network devices are configured to utilize the OSPF protocol, each network device may adjust the weight of the affected network connection within the route table such that the probability of network traffic being routed through this affected network connection is reduced. Accordingly, FIG. 11 shows an illustrative example of a process 1100 for updating network topology in response to obtained results stemming from an executed test plan in accordance with at least one embodiment. The process 1100 may be performed by a bastion server, which may be configured to transmit executable instructions to network devices within a network to perform various analyses and tests as part of the test plan obtained by the bastion server from a user client device. Additionally, certain portions of the process 1100 may be performed by the network devices themselves, particularly any network updates performed in response to the results of the various analyses and tests performed as part of the test plan.

When the bastion server receives a test plan from a user client device connected to the bastion server, the bastion server may access a network topology server to select 1102 a network device pair for testing. In some embodiments, the test plan may specify the network device pair that is to be tested. For instance, a network administrator or other network technician/engineer may want to evaluate a particular network device pair that has presented some issues in the past and wants to make certain that these issues have been properly addressed. Alternatively, the network device pair may be selected upon notification from the network topology service that repairs or other remedial actions have been performed on the connection for the network device pair.

Once the bastion server has selected a network device pair for testing, the bastion server may transmit various requests to each network device of the network device pair to perform 1104 analyses and tests specified within the test plan. For instance, as part of the pre-check and pre-test phases of the test plan, the bastion server may determine whether the interfaces for the network device pair may be activated and whether the physical connection between the network devices of the network device pair is configured correctly (e.g., the interface of a first network device is assigned to be connected with the interface of the second network device, and vice versa). If the network device pair fails any portion of the pre-check and pre-test phases of the test plan, the bastion server may terminate execution of the test plan. Otherwise, the bastion server may execute the test and post-check phases of the test plan and restore the network device interfaces to their original configuration prior to executing the test plan.

If the test plan is terminated as a result of an error or other failure identified during the pre-check or pre-test phase of the test plan or the test plan is executed successfully, the bastion server may obtain 1106, from each network device of the network device pair, the results of the analyses and tests specified within the test plan that were completed. These results may identify any errors and failures identified by these network devices that may need to be addressed in order for the network connection between these network devices to be fully operational. Thus, based at least in part on these obtained results, the bastion server may determine 1108 whether the network topology needs to be updated. For instance, if no errors or failures are detected through the tests and analyses performed, the bastion server may not update the network and instead select 1102 a new network device pair from the network topology service for testing.

If the tests and analyses indicate errors and failures within the connection between the network devices of the network device pair, the bastion server may transmit a request to each network device of the network device pair to perform 1110 an update of the local network topology. For instance, in response to the request, each network device of the network device pair may access their corresponding route table to reduce the probability that network traffic may be routed through this suspect network connection. For example, if the network devices utilize the OSPF protocol, each network device may adjust the weight assigned to the suspect network connection such that network traffic routed through this connection is limited or otherwise restricted. In some embodiments, the bastion server may transmit a request to the network device pair to update their route tables in the event that a previously suspect network connection between these network devices has been successfully repaired. In this instance, each network device may update the route table to enable normal network traffic along the repaired network connection between these network devices. Once the network topology has been updated through an update of these route tables, the bastion server may select 1102 a new network device pair for testing.

Figure 12:
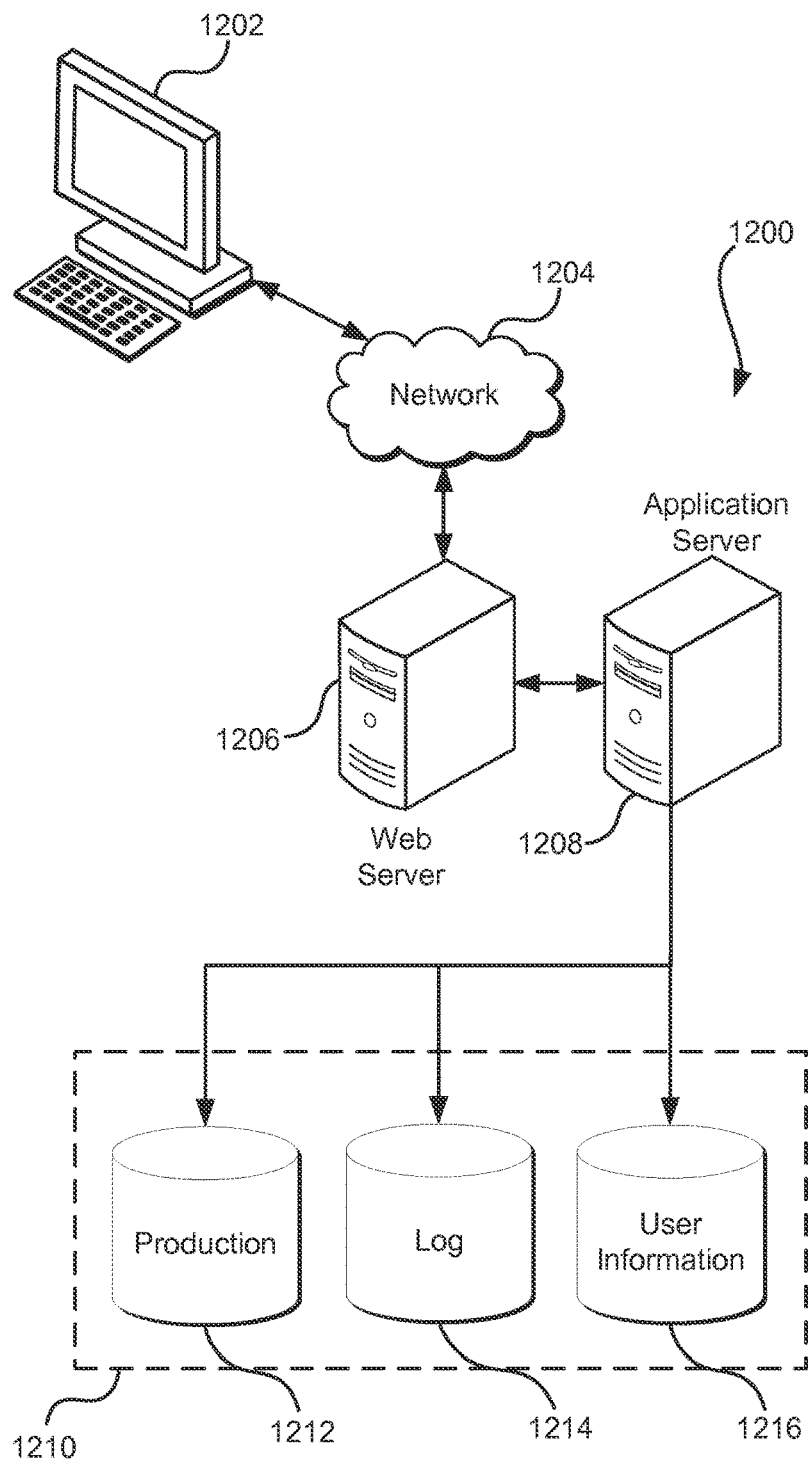
FIG. 12 illustrates an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1202 and the application server 1208, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1210 can include several separate data tables, databases, data documents, dynamic data storage schemes and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining, from a user client device, a test plan that specifies a set of tests to be performed to test connections between pairs of devices in a network;
    obtaining, from a network topology service, network topology information that specifies physical connections between devices of the pairs of devices in the network;
    using the network topology information to select one of the pairs of devices in the network to be a selected pair of devices, the selected pair of devices in the network indicated by the network topology information as having a connection connecting the selected pair of devices;
    transmitting instructions to the devices in the selected pair of devices, wherein the instructions, as a result of being executed by the selected pair of devices, cause the set of tests to be performed to test the connection between the selected pair of devices according to the test plan, performance of the set of tests comprising:
        activating interfaces of the selected pair of devices to enable communication through the connection;
        changing addresses of the interfaces of the selected pair of devices from an initial set of Internet Protocol addresses to a set of test-specific Internet Protocol addresses to the interfaces; and
        returning the selected pair of devices to a configuration prior to performing the set of tests at least by resetting addresses of the interfaces of the selected pair of devices to the initial set of Internet Protocol addresses as a result of completing the set of tests;

obtaining test results of the performed set of tests; and
providing, to the user client device, information generated based at least in part on the test results.

2. The computer-implemented method of claim 1, wherein the method further comprises, as a result of the test results indicating one or more errors associated with at least one device of the selected pair of devices, modifying a route table of the at least one device to avoid routing of network traffic over the physical connections.

3. The computer-implemented method of claim 1, wherein the connection is a physical connection connecting the selected pair of devices.

4. The computer-implemented method of claim 3, wherein:
the set of tests include a subset of tests that, when performed, causes the selected pair of devices to determine whether there is a problem with interfaces of the devices in the selected pair of devices or with the physical connections connecting the devices in the selected pair of devices; and
the method further comprises, as a result of the subset of tests indicating there is no problem with the interfaces or the physical connection, performing a set of remaining tests of the set of tests.

5. A system, comprising at least one computing device that implements one or more services, wherein the one or more services:
obtain a test plan that specifies a set of tests to be performed to test a connection between a selected pair of devices in a network;
transmit instructions to the selected pair of devices, the instructions, as a result of execution by the selected pair of devices, causing the set of tests to be performed to test the connection between the selected pair of devices according to the test plan, performance of the set of tests causing the selected pair of devices to:
activate interfaces of the selected pair of devices to enable communication through the connection;
change addresses of the interfaces of the selected pair of devices from an initial set of addresses to a set of test-specific addresses to the interfaces; and
return the selected pair of devices to a configuration prior to performing the set of tests at least by reset addresses of the interfaces of the selected pair of devices to the initial set of addresses as a result of completing the set of tests; and
obtain a set of test results of the performed set of tests.

6. The system of claim 5, wherein the one or more services further provide the set of test results to a network topology service, causing the network topology service to compile the set of test results with other sets of test results for other pairs of devices in the network.

7. The system of claim 5, wherein:
the test plan is provided by a user client device connected to the one or more services; and
the one or more services further provide the set of test results to the user client device.

8. The system of claim 5, wherein the set of tests cause devices in the selected pair of devices to:
the set of test-specific addresses are test-specific Internet Protocol addresses;
assign the test-specific Internet Protocol addresses to interfaces of the devices in the selected pair of devices; and reset the devices in the selected pair of devices to restore Internet Protocol addresses of the devices in the selected pair of devices used prior to performance of the set of tests.

9. The system of claim 5, wherein the one or more services further:
obtain, from a network topology service, network topology information that specifies physical connections between devices in the network; and
utilize the network topology information to select the selected pair of devices in the network.

10. The system of claim 5, wherein the one or more services further, as a result of the set of test results indicating one or more errors associated with at least one device of the selected pair of devices, provide a request to the devices in the selected pair of devices to update a route table to route network traffic around a physical connection between the selected pair of devices.

11. The system of claim 5, wherein:
the set of tests include a subset of tests that, when performed, causes the selected pair of devices to identify any failures or errors associated with interfaces of devices in the selected pair of devices or with a physical connection connecting the devices in the selected pair of devices; and
the one or more services further provide instructions to the devices in the selected pair of devices to perform further tests of the set of tests upon detecting no failures or errors associated with the interfaces of the devices or the physical connection.

12. The system of claim 5, wherein the set of tests cause devices in the selected pair of devices to, based at least in part on a determination of whether any interfaces of the devices in the selected pair of devices are offline, activate offline interfaces of the devices in the selected pair of devices to enable communication a physical connection.

13. A non-transitory computer-readable storage medium having stored thereon executable instructions that, as a result of being executed by one or more processors of a computer system, cause the computer system to:
provide test instructions obtained from a user client device to a selected pair of devices in a network, the test instructions, as a result of being executed by the selected pair of devices, cause performance of a set of tests from a test plan to:
activate interfaces of the selected pair of devices to enable communication through a connection between the selected pair of devices;
change addresses of the interfaces of the selected pair of devices from an initial set of addresses to a set of test-specific addresses to the interfaces;
test the connection between the selected pair of devices; and
return the selected pair of devices to a configuration prior to performing the set of tests at least by reset addresses of the interfaces of the selected pair of devices to the initial set of addresses; and
compile test results of the performed set of tests into a report for identifying a status of a physical connection between the selected pair of devices.

14. The non-transitory computer-readable storage medium of claim 13, wherein the executable instructions further cause the computer system to, as a result of the test results indicating that one or more errors are associated with at least one device of the selected pair of devices, providing a request to the devices in the selected pair of devices to adjust a weight for the physical connection within a route table to alter routing of network traffic over the physical connection.

15. The non-transitory computer-readable storage medium of claim 13, wherein the executable instructions further cause the computer system to:
provide a request to a network topology service to obtain network topology information that specifies physical connections between devices of pairs of devices in the network; and
use the network topology information to select the selected pair of devices in the network.

16. The non-transitory computer-readable storage medium of claim 13, wherein the set of tests cause the selected pair of devices to activate one or more offline interfaces of the devices in the selected pair of devices to enable communication through the physical connection.

17. The non-transitory computer-readable storage medium of claim 13, wherein:
the set of tests include a subset of tests that identifies issues associated with interfaces of the selected pair of devices or the physical connection; and
the executable instructions further cause the computer system to provide the test instructions to the selected pair of devices to perform further tests of the set of tests upon determining that the subset of tests was passed.

18. The non-transitory computer-readable storage medium of claim 13, wherein the executable instructions further cause the computer system to provide the set of test results to a network topology service, causing the network topology service to catalog the set of test results and enable network administrators to access the set of test results.

19. The non-transitory computer-readable storage medium of claim 13, wherein the set of test-specific addresses are test-specific Internet Protocol addresses and the set of tests cause the selected pair of devices to assign the test-specific Internet Protocol addresses to interfaces of the selected pair of devices to establish Internet Protocol connectivity through the physical connection.

20. The non-transitory computer-readable storage medium of claim 13, wherein the executable instructions further cause the computer system to provide the test results to a user client device.

* * * * *